United States Patent
Lomonaco et al.

(10) Patent No.: US 11,755,742 B2
(45) Date of Patent: Sep. 12, 2023

(54) BUILDING MANAGEMENT SYSTEM WITH CYBER HEALTH DASHBOARD

(71) Applicant: Johnson Controls Technology Company, Auburn Hills, MI (US)

(72) Inventors: Carol Lomonaco, Wauwatosa, WI (US); John S. Jilek, Grafton, WI (US); Alan J. Bronikowski, South Milwaukee, WI (US); Joshua A. Edler, Oak Creek, WI (US); Suvidha Raina, Milwaukee, WI (US); Dana A. Guthrie, St. Francis, WI (US); Benjamin W. Hapka, Germantown, WI (US); Steven A. Brukbacher, Germantown, WI (US); Christopher R. Gozdziewski, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 190 days.

(21) Appl. No.: 16/554,352

(22) Filed: Aug. 28, 2019

(65) Prior Publication Data
US 2021/0064759 A1 Mar. 4, 2021

(51) Int. Cl.
*G06F 21/57* (2013.01)
*G05B 13/02* (2006.01)
(Continued)

(52) U.S. Cl.
CPC .......... *G06F 21/577* (2013.01); *G05B 13/02* (2013.01); *G06F 8/65* (2013.01); *G06F 9/451* (2018.02);
(Continued)

(58) Field of Classification Search
CPC .......... G06F 21/577; G06F 9/451; G06F 8/65; G06F 21/46; G06F 2221/033; G05B 13/02
See application file for complete search history.

(56) References Cited

U.S. PATENT DOCUMENTS 10,019,677 B2 7/2018 Gill et al.
10,102,570 B1 * 10/2018 Kapczynski .......... G06Q 40/02
(Continued)

FOREIGN PATENT DOCUMENTS

CN 109787982 5/2019

OTHER PUBLICATIONS

Search Report on EP 20193175.5, dated Jan. 22, 2021, 7 pages.

*Primary Examiner* — Tadesse Hailu
*Assistant Examiner* — Darrin Hope
(74) *Attorney, Agent, or Firm* — Foley & Lardner LLP

(57) ABSTRACT

A method for automatically detecting and mitigating risks related to cybersecurity in a Building Management System (BMS) includes evaluating settings of a user account of the BMS; identifying a security risk associated with the settings of the user account; evaluating settings of a network device of the BMS; identifying another security risk associated with the settings of the network device, presenting a user interface, wherein the user interface allows a user to view a policy recommendation associated with either security risk; and implementing the change in the settings of the user account or a change in the settings of the network device based at least in part on an input from the user via the user interface or an automated response to the policy recommendation. The method allows for administrators to easily view and change settings of user accounts and network devices to improve the cybersecurity of the BMS.

18 Claims, 23 Drawing Sheets

(51) Int. Cl.
*G06F 21/46* (2013.01)
*G06F 9/451* (2018.01)
*G06F 8/65* (2018.01)

(52) U.S. Cl.
CPC ........ *G06F 21/46* (2013.01); *G06F 2221/033* (2013.01)

(56) References Cited

U.S. PATENT DOCUMENTS

| | | |
|---|---|---|
| 2004/0250107 A1 | 12/2004 | Guo |
| 2009/0165106 A1 | 6/2009 | Eldridge et al. |
| 2011/0047418 A1 | 2/2011 | Drees et al. |
| 2013/0145356 A1* | 6/2013 | Ran ........................ G06F 21/57 717/170 |
| 2016/0171415 A1* | 6/2016 | Yampolskiy ........ H04L 61/2007 705/7.28 |
| 2017/0053115 A1* | 2/2017 | Healy ................... G06Q 20/20 |
| 2017/0063873 A1 | 3/2017 | Hidden et al. |
| 2017/0078322 A1* | 3/2017 | Seiver ..................... H04L 41/12 |
| 2018/0102954 A1* | 4/2018 | Schubert ............. H04L 12/4625 |
| 2018/0211045 A1* | 7/2018 | Abukhovsky ......... G06F 21/577 |
| 2018/0375892 A1 | 12/2018 | Ganor |
| 2020/0110870 A1* | 4/2020 | Girdhar ................ H04L 63/108 |

\* cited by examiner

SECURITY ANALYSIS

Summary  Critical Issues  Potential Risks  Informational                 ▣FILTER▾

Account Related
32 total user accounts exist
View Details                                        ◉Policy Recommendation

Account Related
31 user accounts belong to Standard access type
View Details                                        ◉Policy Recommendation

Account Related
28 active user accounts exist
View Details                                        ◉Policy Recommendation

Account Related
3 disabled user accounts exist
View Details                                        ◉Policy Recommendation

Account Related
2 user accounts have administrator role
View Details                                        ◉Policy Recommendation

Server Related
2 network engines have software at Release 8.1 or later
View Details                                        ◉Policy Recommendation

2100 ⟶

SYSTEM STATUS

Summary  Engine Details                   ▣FILTER▾  Advanced Security: Off ⟵ 2102

| NAME | IP ADDRESS▾ | CERTIFICATE EXPIRATION | VERSION | STATUS |
|---|---|---|---|---|
| tanus12r23:N50-52 | 172.21.21.8 | | 5.2.0.5400 | Online |
| tanus12r23:N50-80 | 172.21.21.6 | | 7.0.7.1010 | Online |
| tanus12r23:NAE40 -22 | 172.21.6.18 | | 5.2.0.5400 | Online |
| tanus12r23:FUltest 45-3 | 172.21.6.13 | | 7.0.0.4000 | Online |
| tanus12r23:NCE-6 -0 | 172.21.6.10 | | 6.0.0.9000 | Online |

USER ACTIVITY

📅 Last 30 Days 1.5
1
0.5
0
   14. Jan    21. Jan    28. Jan    4. Feb

○ Successful Logins   ▫ Unsuccessful Logins   ◇ Locked Out Accounts

FIG. 21

BUILDING MANAGEMENT SYSTEM WITH CYBER HEALTH DASHBOARD

BACKGROUND

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, and any other system that is capable of managing building functions or devices, or any combination thereof. A BMS may include a variety of devices (e.g., HVAC devices, controllers, chillers, fans, sensors, etc.) configured to facilitate monitoring and controlling building spaces. Devices can be configured to communicate with other devices via a network, such as a Building Automation and Control network (BACnet) or a Local Area Network and from potential external attacks.

A BMS may have security features that generally allow an administrator to manage settings associated with user accounts and network devices. However, technical limitations of the BMS may prevent the administrator from being able to easily assess and mitigate issues related to cyber security. As such, the BMS may be vulnerable to cyber threats from malicious attackers both within the Local Area Network and from potential external attacks.

SUMMARY

In one implementation of the present disclosure, a method for automatically detecting and mitigating risks related to cybersecurity in a Building Management System (BMS) is disclosed. The method includes evaluating settings of a user account of the BMS; identifying a first security risk associated with the settings of the user account; and evaluating settings of a network device of the BMS. The method also includes identifying a second security risk associated with the settings of the network device; presenting a user interface to a user on a user device, wherein the user interface allows the user to view a policy recommendation associated with the first security risk or the second security risk; presenting a user interface to a user on a user device, wherein the user interface allows the user to view a policy recommendation associated with the first security risk or the second security risk; and implementing a change in the settings of the user account or the settings of the network device within the BMS based at least in part on an input from the user or an automated response to the policy recommendation.

In some embodiments, identifying the first security risk includes at least one selected from a group of determining that the user account has an inactive session without a session timeout period; determining that the user account has a password that does not expire; determining that the user account does not have a password history policy; determining that the user account does not have lockout settings; determining that the user account has a lockout policy that has a number of attempts greater than a first threshold or a lockout time greater than a second threshold; determining that the user account is dormant; determining that the user account has a maximum password age greater than a third threshold; determining that the user account has an inactive session period greater than a fourth threshold; and determining that the user account is a temporary user account.

In some embodiments, the first security risk is more severe than the second security risk, the method further including presenting, on the user interface, the first security risk as a critical issue; and presenting, on the user interface, the second security risk as a potential risk.

In some embodiments, identifying the second security risk includes determining that the network device is running outdated software.

In some embodiments, the network device is a server of the BMS.

In some embodiments, the method further includes presenting, on the user interface, a graph of user activity within the BMS over a period of time. The graph shows at least one selected from a group of a number of successful logins; a number of unsuccessful logins; and a number of locked out accounts.

In some embodiments, the method further includes presenting, on the user interface, an assessment of all user accounts associated with the BMS and an assessment of all network devices associated with the BMS.

In some embodiments, implementing the change in the settings of the user account includes at least one selected from a group of receiving a change in password policy settings of the user account and receiving the change in the settings of the user account includes receiving a change in lockout settings of the user account.

In some embodiments, the method further includes presenting, on the user interface, a dialog box associated with the user account that allows the user to navigate to a user account page associated with the user account.

In some embodiments, implementing the change in the settings of the network device includes receiving a software update.

In another implementation, a Building Management System (BMS) is described. The BMS includes one or more computer-readable storage media having instructions stored thereon that, when executed by one or more processors, cause the one or more processors to implement operations. The operations include evaluating settings of a user account of the BMS; identifying a first security risk associated with the settings of the user account; evaluating settings of a network device of the BMS; and identifying a second security risk associated with the settings of the network device. The operations further include presenting a user interface to a user on a user device, wherein the user interface allows the user to view a policy recommendation associated with the first security risk or the second security risk; presenting a user interface to a user on a user device, wherein the user interface allows the user to view a policy recommendation associated with the first security risk or the second security risk; and implementing a change in the settings of the user account or the settings of the network device within the BMS based at least in part on an input from the user or an automated response to the policy recommendation.

In some embodiments, identifying the first security risk includes at least one selected from a group of determining that the user account has an inactive session without a session timeout period; determining that the user account has a password that does not expire; determining that the user account does not have a password history policy; and determining that the user account does not have lockout settings.

In some embodiments, identifying the first security risk includes at least one selected from a group of determining that the user account has a lockout policy that has a number of attempts greater than a first threshold or a lockout time greater than a second threshold; determining that the user account is dormant; determining that the user account has a maximum password age greater than a third threshold; determining that the user account has an inactive session period greater than a fourth threshold; and determining that the user account is a temporary user account.

In some embodiments, identifying the second security risk includes determining that the network device is running outdated software.

In some embodiments the first security risk is less severe than the second security risk, the operations further including presenting, on the user interface, the first security risk as a potential risk; and presenting, on the user interface, the second security risk as a critical issue.

In some embodiments, the operations further include presenting, on the user interface, a graph of user activity within the BMS over a period of time. The graph may show at least one selected from a group of a number of successful logins; a number of unsuccessful logins; and a number of locked out accounts.

In some embodiments, the operations further include presenting, on the user interface, an assessment of all user accounts associated with the BMS and an assessment of all network devices associated with the BMS.

In some embodiments, implementing the change in the settings of the user account includes at least one selected from a group of receiving a change in password policy settings of the user account and receiving a change in lockout settings of the user account.

In some embodiments, the operations further include presenting, on the user interface, a dialog box associated with the user account that allows the user to navigate to a user account page associated with the user account.

In some embodiments, implementing the change in the settings of the network device includes receiving a software update.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 21 is a drawing of another example system status interface associated with the cyber health management system of FIG. 5, according to some embodiments.

DETAILED DESCRIPTION

Overview

Referring generally to the FIGURES, systems and methods for improving cyber health of a BMS are shown, according to various embodiments. The BMS is configured to identify vulnerabilities related to cyber health and alert users of such vulnerabilities via a user interface. The user interface is generally a dashboard interface that alerts users of potential risks and critical issues related to cyber health of the BMS. The user interface provides policy recommendations related to user accounts and network devices associated with the BMS. The user can act on such policy recommendations and update various settings of the BMS through the user interface. This functionality allows users to easily assess and improve cyber health of the BMS. The functionality warns the user of imminent dangers to the BMS system or attacks against the BMS system that may be in progress.

The presently disclosed embodiments offer a snap-shot view which brings together, in one summary window, issues related to the cyber health of a BMS along with information about how to improve the cyber health of the BMS. An administrator can access the snap-shot view via a user interface and easily change configuration settings of various user accounts and network devices based on information in the summary window. The administrator can change the configuration settings by viewing a policy recommendation displayed on the user interface and selecting an option to change the configuration settings based on the policy recommendation. Each selection can be easily made from the summary window. This functionality may provide advantages in ease and speed of navigating and/or changing configuration settings of various user accounts and network devices of a BMS to prevent malicious cyber-attacks.

Building Management System

Figure 1:
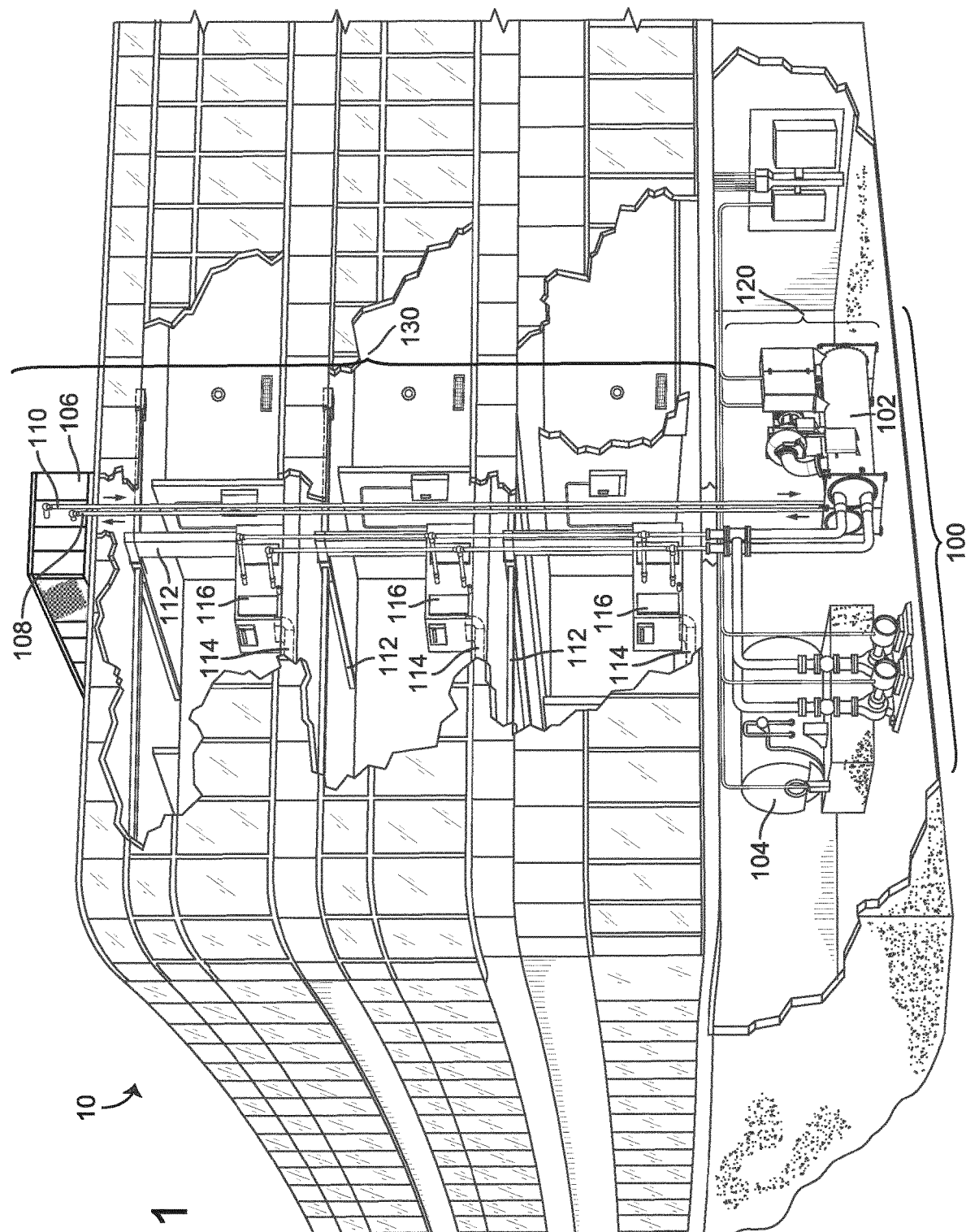
FIG. 1 is a drawing of a building equipped with a building management system (BMS) and a HVAC system, according to some embodiments.
Figure 2:
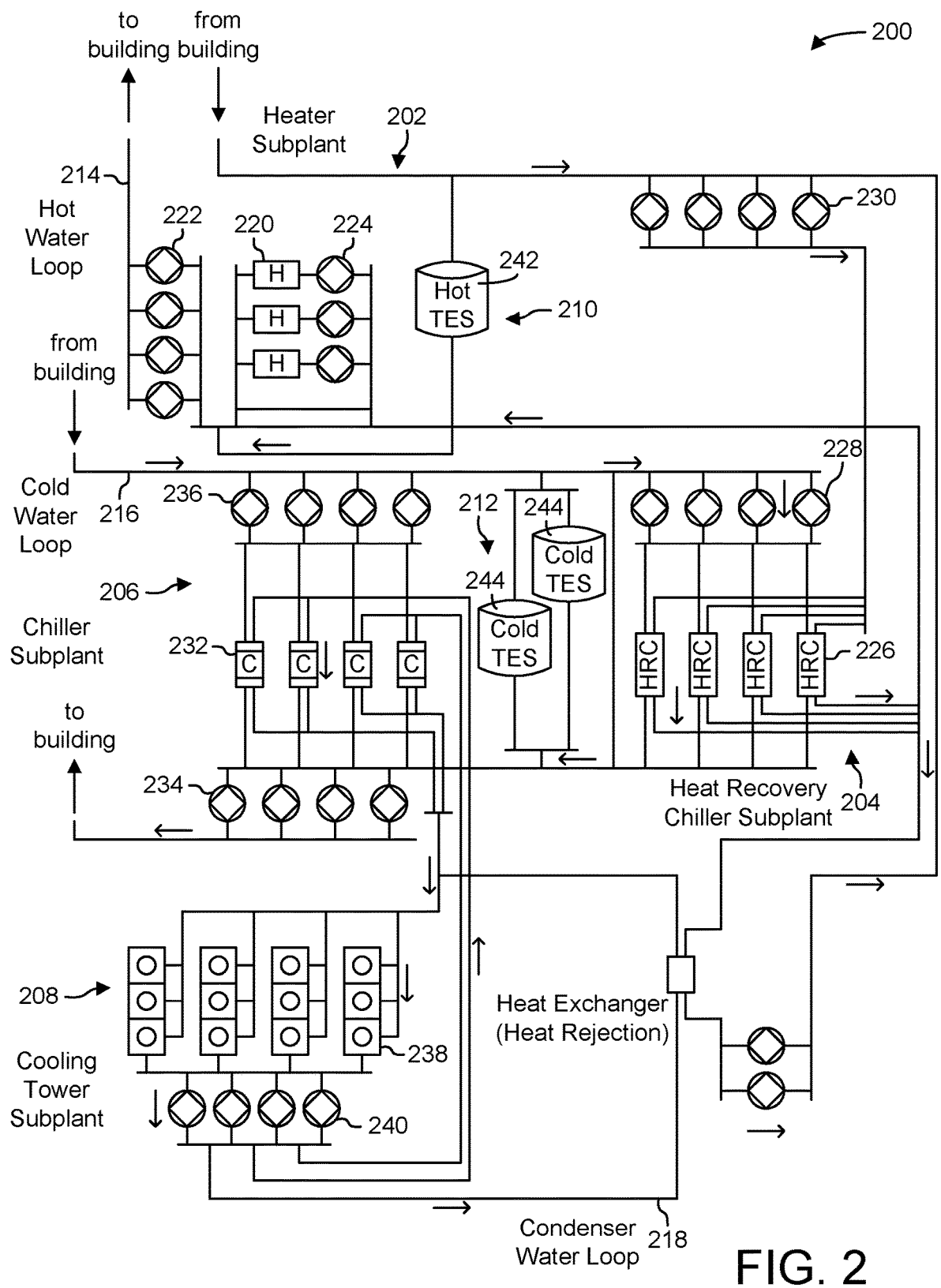
FIG. 2 is a block diagram of a waterside system which can be used as part of the HVAC system of FIG. 1, according to some embodiments.
Figure 3:
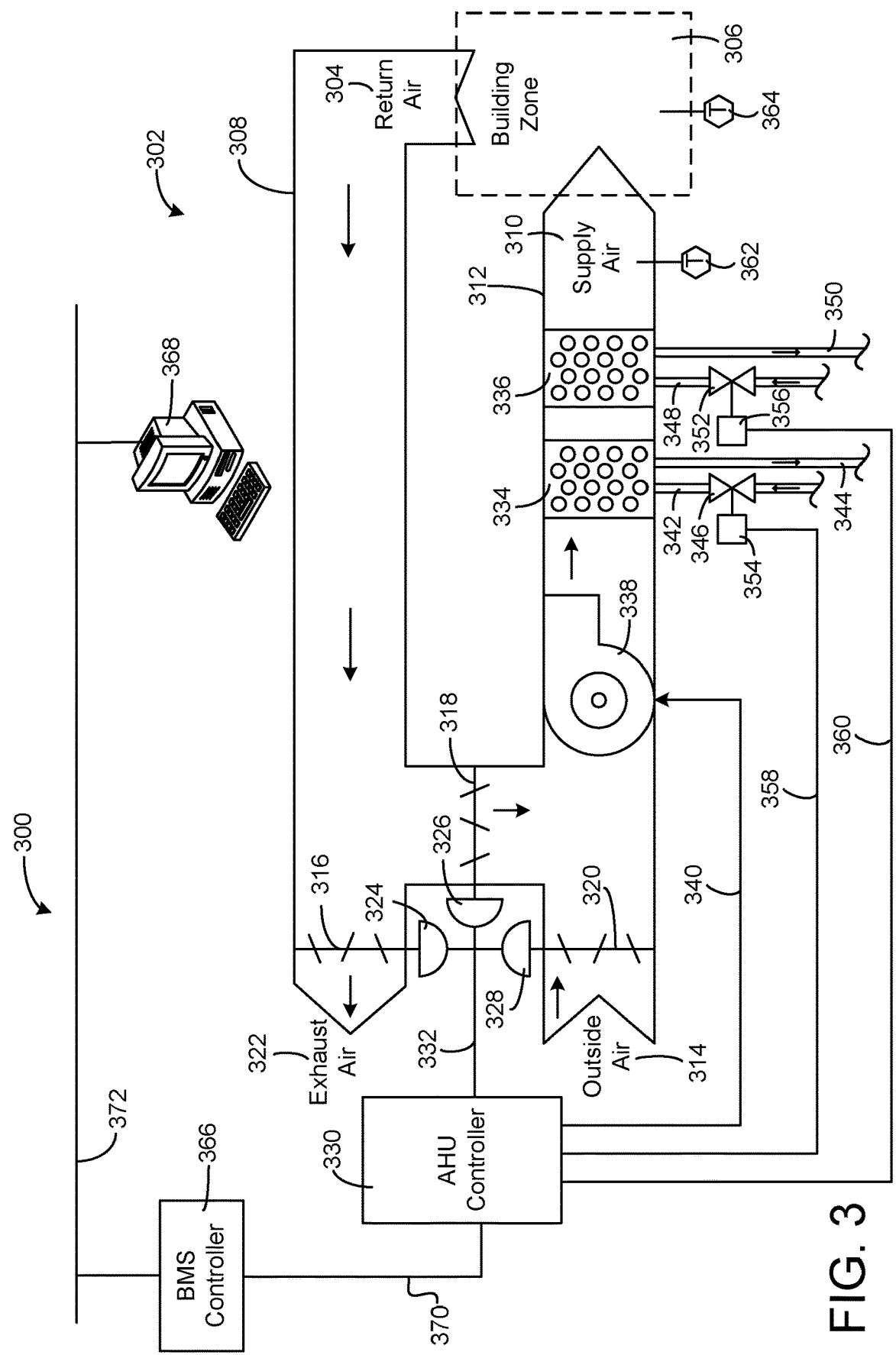
FIG. 3 is a block diagram of an airside system which can be used as part of the HVAC system of FIG. 1, according to some embodiments.
Figure 4:
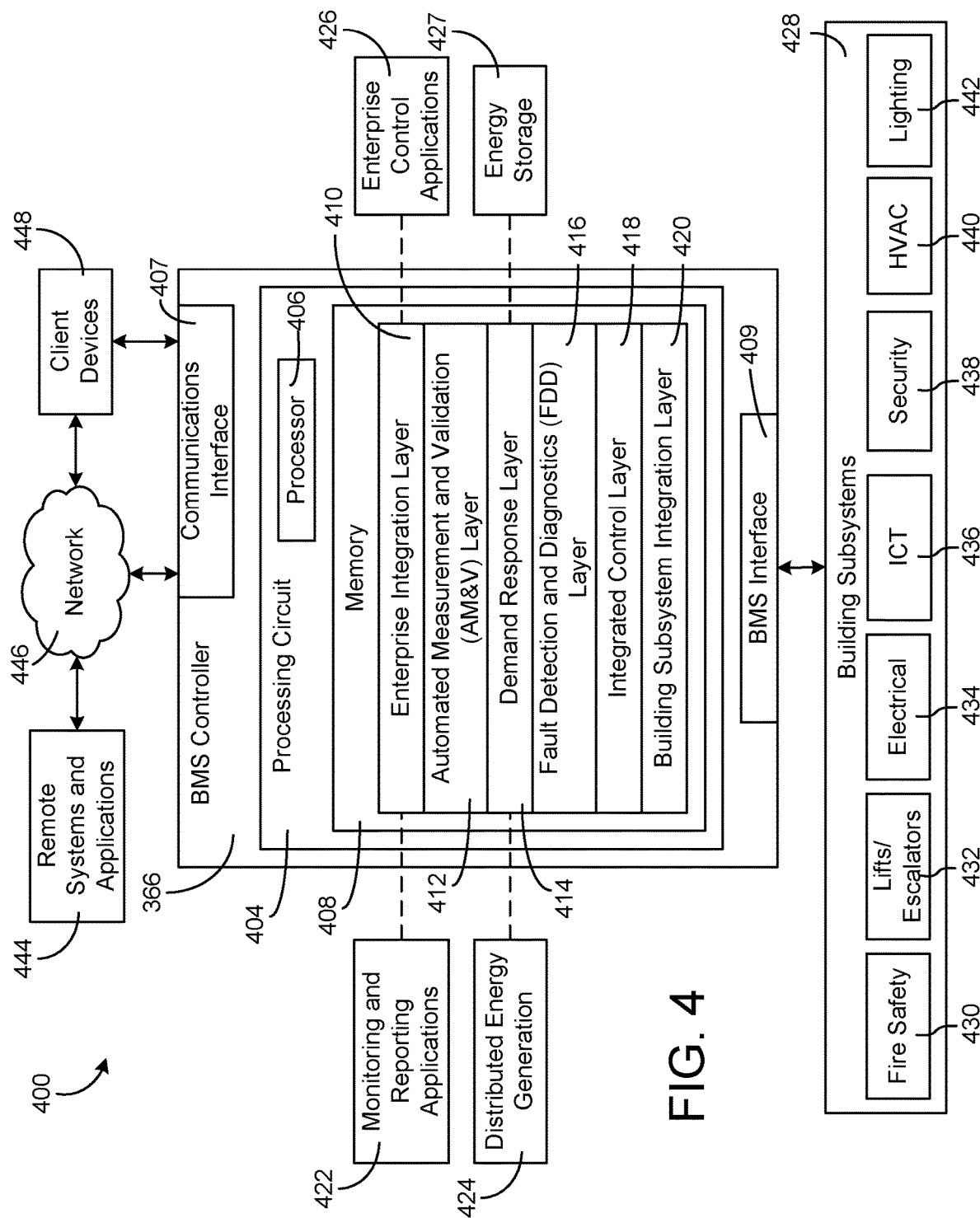
FIG. 4 is a block diagram of a BMS which can be used in the building of FIG. 1, according to some embodiments.

Referring now to FIGS. 1-4, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10.

Referring particularly to FIG. 1, a perspective view of a building 10 is shown. Building 10 is served by a BMS. A BMS is, in general, a system of devices configured to control, monitor, and manage equipment in or around a building or building area interconnected by a Local Area Network (LAN). A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

In some embodiments, HVAC system 100 uses free cooling to cool the working fluid. For example, HVAC system 100 can include one or more cooling towers or heat exchangers which transfer heat from the working fluid to outside air. Free cooling can be used as an alternative or supplement to mechanical cooling via chiller 102 when the temperature of the outside air is below a threshold temperature. HVAC system 100 can switch between free cooling and mechanical cooling based on the current temperature of the outside air and/or the predicted future temperature of the outside air.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, waterside system 200 uses free cooling to cool the water in cold water loop 216. For example, the water returning from the building in cold water loop 216 can be delivered to cooling tower subplant 208 and through cooling towers 238. Cooling towers 238 can remove heat from the water in cold water loop 216 (e.g., by transferring the heat to outside air) to provide free cooling for the water in cold water loop 216. In some embodiments, waterside system 200 switches between free cooling with cooling tower subplant 208 and mechanical cooling with chiller subplant 208 based on the current temperature of the outside air and/or the predicted future temperature of the outside air. An example of a free cooling system which can be used in waterside system 200 is described in greater detail with reference to FIG. 6.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

In some embodiments, AHU controller 330 uses free cooling to cool supply air 310. AHU controller 330 can switch between free cooling and mechanical cooling by operating outside air damper 320 and cooling coil 334. For example, AHU controller 330 can deactivate cooling coil 334 and open outside air damper 320 to allow outside air 314 to enter supply air duct 312 in response to a determination that free cooling is economically optimal. AHU controller 330 can determine whether free cooling is economically optimal based on the temperature of outside air 314 and/or the predicted future temperature of outside air 314. For example, AHU controller 330 can determine whether the temperature of outside air 314 is predicted to be below a threshold temperature for a predetermined amount of time. An example of free cooling switching logic which can be used by AHU controller 330 is described in greater detail with reference to FIG. 10.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372 (e.g., a LAN).

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, LAN, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems

428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Cyber Health Dashboard

Figure 5:
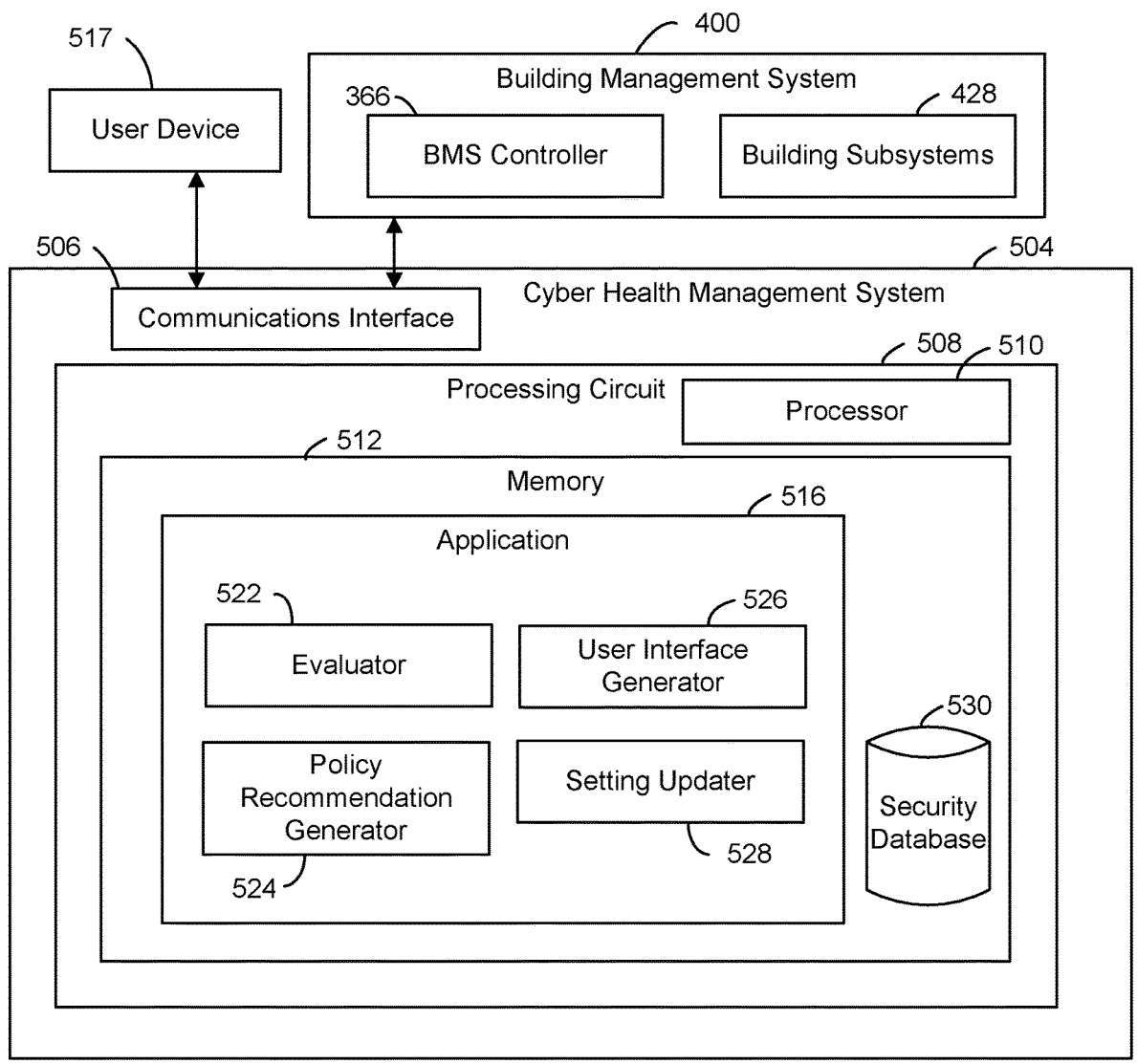
FIG. 5 is a block diagram of a cyber health management system associated with the BMS of FIG. 4, according to some embodiments.

Referring now to FIG. 5, a block diagram of a cyber health management system 504 associated with BMS 400 is shown, according to some embodiments. Cyber health management system 504 may be implemented within one or more network devices associated with BMS 400 such as BMS controller 366 and/or client device 368. Cyber health management system 504 may be in communication with a user device 517 through a LAN or another type of connection. Cyber health management system 504 may provide an interactive cyber health dashboard user interface to user device 517. An administrator at user device 517 may interact with the cyber health dashboard to view and manage security vulnerabilities related to BMS 400. Consequently, the administrator can easily improve the cybersecurity functioning of BMS 400 to stop malicious third parties from hacking into and accessing BMS 400.

Cyber health management system 504 is shown to include a communications interface 506 and a processing circuit 508 having a processor 510 and a memory 512. Processing circuit 508 can be communicably connected to communications interface 506 such that processing circuit 508 and the various components thereof can send and receive data via communications interface 506. Processor 510 can be implemented as a general purpose processor, an application specific integrated circuit (ASIC), one or more field programmable gate arrays (FPGAs), a group of processing components, or other suitable electronic processing components.

Memory 512 (e.g., memory, memory unit, storage device, etc.) can include one or more devices (e.g., RAM, ROM, Flash memory, hard disk storage, etc.) for storing data and/or computer code for completing or facilitating the various processes, layers and modules described herein. Memory 512 can include volatile memory or non-volatile memory. Memory 512 can include database components, object code components, script components, or any other type of information structure for supporting the various activities and information structures described in the present application. According to an example embodiment, memory 512 is communicably connected to processor 510 via processing circuit 508 and includes computer code for executing (e.g., by processing circuit 508 and/or processor 510) one or more processes described herein. In some embodiments, cyber health management system 504 is implemented within a single computer (e.g., one server, one housing, etc.). In various other embodiments, cyber health management system 504 is distributed across multiple servers or computers (e.g., that can exist in distributed locations).

Memory 512 is shown to include an application 516. Application 516 can process data associated with servers and/or user accounts to identify cybersecurity risks and/or determine a cyber health assessment of BMS 400 to display via the cyber health dashboard interface. The cyber health assessment may include indicators of issues associated with user accounts and/or servers or other network devices that could enable hackers to gain access to BMS 400. Application 516 is shown to include an evaluator 522, a policy recommendation generator 524, a user interface generator 526, and a setting updater 528. Each of components 522-528 may cooperate to parse through settings and configurations of user accounts, servers, and various network devices associated with BMS 400 to identify any settings and/or configurations that pose a security risk, generate appropriate policy recommendations including information on how to resolve the security risks (e.g., suggestions for setting or configuration changes), present a user interface with this information to an administrator via the cyber health dashboard interface, and update the settings or configurations based on inputs received from the administrator responsive to the policy recommendations. Consequently, the administrator can easily improve the cyber health of BMS 400 by viewing and managing security risks associated with BMS 400 via the cyber health dashboard interface. The system can provide suggestions that include locking out a user account that appears to be under attack or taking other definitive action to thwart an attacker.

User device 517 may be any electronic device that allows administrators to interact with BMS 400 through a user interface. Examples of user devices include, but are not limited to, mobile phones, electronic tablets, laptops, desktop computers, workstations, televisions, and other types of electronic devices. User device 517 may be similar to client device 368 as described above. User device 517 may send requests and otherwise interface with BMS 400 through a web interface (e.g., using a web browser and HTTP/HTTPS protocols) or another type of interface (e.g., mobile application, desktop application). User device 517 may present the cyber health dashboard interface to a user of user device 517, thereby enabling the user to easily view and manage issues relating to the cybersecurity of BMS 400 and take action when necessary.

Evaluator 522 may be configured to evaluate user accounts and network devices associated with BMS 400 to identify security vulnerabilities. As described herein, network devices may include servers, controllers, network engines, and other building devices connected to network associated with BMS 400. The network devices such as controllers and network engines may have BMS server software installed thereon, and therefore may act as servers within BMS 400. Evaluator 522 can be configured to identify a variety of different types of security issues, some of which may be more severe than others. For example, evaluator 522 can identify issues that may require an administrator's immediate attention as a critical issue (e.g., a user account has an inactive session set to never terminate) and issues that are less severe as potential risks (e.g., a user has not changed their password in more than 60 days). In some instances, potential hackers may exploit critical issues to gain access to BMS 400 more easily than hackers may exploit potential risks. Further, evaluator 522 may be configured to identify other information about user accounts and network devices such as a role of a user account (e.g., administrator, operator, maintenance, etc.), user login history, current software installed on network devices, permissions associated with user accounts, identifiers for network devices (e.g., IP address), and other information such as described herein.

Cyber health management system 504 is also shown to include a security database 530. Security database 530 can be implemented using a variety of different types of databases such as a graph database, MySQL, Oracle, Microsoft SQL, PostgreSq1, DB2, document store, search engine, device identifier-value store, and other types of databases. Security database 530 can generally store and maintain a directory of user accounts associated with BMS 400. Security database 530 may store various settings and/or configurations of the user accounts and network devices associated with BMS 400. For example, each user account may have settings and/or configurations related to a maximum password age, a password history policy, time until termination of an inactive session, number of unsuccessful login attempts before being locked out, time until an inactive user account is considered dormant, etc. Each setting and/or configuration may be associated with a value (e.g., password expires in 60 days, remember 10 passwords, inactive session terminates after 30 minutes, etc.) The settings may be associated with default values, but the values can be changed by an administrator and/or users associated with the user account. The various settings and/or configurations including their values may be stored in a look-up table with labels indicating whether they are associated with a cybersecurity issue and, if they are, the severity of the issue (e.g., whether they are critical issues or potential risks). Security database 530 may also store policy recommendations associated with each potential risk, critical issue, or other information in the same or a different look-up table.

Further, security database 530 may include other information about the user accounts. For example, security database 530 may include information about roles of user accounts. Examples of roles can include, but are not limited to, operator, administrator, user, and maintenance. Each role may be allowed various permissions for access to BMS 400. For example, only administrators may be allowed to access the cyber health dashboard and change user account and/or server settings of various user accounts and servers.

Security database 530 may also store information about servers or various other network devices of BMS 400 such as data about which version of software the network devices are operating on, IP addresses and other identifiers for the network devices, online/offline statuses, protocols that the network devices are implementing, and various network characteristics of BMS 400. Other examples of data associated with network devices may include, but are not limited to, allow HTTP (e.g., allow the network devices to access insecure websites), advanced security, issue severity levels, anti-spyware software version number, device diagnostic attributes (e.g., battery condition, CPU usage, flash usage, objet memory, memory usage, CPU temp, estimated flash available, etc.), firewall settings, and firmware versions. The data defining characteristics of various network devices may be associated with values that can be updated by a user and/or an administrator. The characteristics or attributes of the data can be associated with a look-up table indicating if the values of the data are associated with issues and, if they are, the severity of the issues. Each issue may be associated with a policy recommendation for how to resolve it so malicious parties cannot exploit the issue to gain access to BMS 400.

Evaluator 522 may be configured to identify issues and information about user accounts and network devices of BMS 400 by comparing the settings and/or configurations of each user account or network device with the issues stored in security database 530 of cyber health management system 504. For a user account or a network device, evaluator 522 may compare each individual setting of the user account or network device to the critical issues of security database 530 and determine if a setting matches a critical issue or a potential risk. If a setting does not match a critical issue or a potential risk, evaluator 522 may otherwise determine the setting to be informational. In some cases, evaluator 522 may identify multiple critical issues and/or potential risks for a single user account or server. In some cases, evaluator 522 may identify multiple user accounts or servers that are associated with the same critical issue or potential risk.

Evaluator 522 may identify critical issues and/or potential risks for each user account that is associated with BMS 400. Evaluator 522 may determine a number of user accounts that are associated with each critical issue and/or potential risk by incrementing and maintaining counters associated with each critical issue and/or potential risk. Evaluator 522 may increment the counters for each user account that evaluator 522 has determined is associated with the critical issue and/or potential risk of the counter. Evaluator 522 may alert an administrator, via the cyber health dashboard interface, for each critical issue and/or potential risk that evaluator 522 detects. In some embodiments, evaluator 522 compares the counts associated with each critical issue and/or potential risk to a predetermined threshold, as set by an administrator, and sends an alert to an administrator upon determining that a count of a critical issue and/or potential risk exceeds the predetermined threshold.

For example, evaluator 522 may compare the settings of user accounts to a look-up table in a database (e.g., security database 530) of cyber health management system 504. For example, evaluator 522 may identify 10 user accounts that have a password setting indicating their password will never expire. Evaluator 522 may identify these settings as critical issues by comparing the settings to the look-up table and identifying a matching setting in the look-up table. The matching setting may be labelled as a critical issue. Evaluator 522 may increment and maintain a counter associated with the critical issue to 10 based on the number of user accounts that are experiencing the critical issue. Evaluator 522 may send an alert to an administrator for each user account experiencing the critical issue. In some cases, evaluator 522 may only send an alert to the administrator if the number of user accounts experiencing the critical issue exceeds a predetermined threshold (e.g., 8). In such cases, evaluator 522 may generate and/or send an alert identifying the number of user accounts and an identifier of each user account experiencing the critical issue to an administrator via the cyber health dashboard so that the administrator can take action against the cyber threat.

Policy recommendation generator 524 may be configured to generate a policy recommendation for any critical issues, potential risks, or other information that evaluator 522 identifies when analyzing the user accounts and network devices of BMS 400. Each critical issue, potential risk, and/or other information may be associated with a unique policy recommendation. Policy recommendations may be administrator-generated policies that can include settings that can be implemented in user accounts or network devices to improve cyber health of BMS 400 at-large. For example, users of BMS 400 may implement company policies to ensure compliance with cybersecurity regulations. Policy recommendation generator 524 may generate policy recommendations by identifying a critical issue, potential risk, or other information and comparing the identified critical issue, potential risk, or information to a look-up table of security database 530. Based on the comparison, policy recommendation generator 524 may identify and generate a policy recommendation that is associated with the identified critical issue, potential risk, or other information. The policy recommendations may be associated with cybersecurity best practices such as standards set in the National Institute of Standards and Technology SP 53 Rev. 4 information assurance controls and other cybersecurity standards.

The policy recommendations may help prevent cyber-attacks because the settings associated with the policy recommendations may make it harder for a malicious third party to hack into an account or a network device based on the settings. For example, settings may require user accounts to change their password every 60 days. Such a setting may cause user account passwords to be different from passwords that users use for websites or other applications. Further, if a hacker somehow gains access to the password, the password may only be useful for a small length of time before the user associated with the user account changes it. Implementing a password history policy in this manner can limit the utility of using keystroke loggers to hack into user accounts via weak passwords that are the same across other accounts that are associated with the same user (e.g., passwords that the user uses to login to various websites).

User interface generator 526 may be configured to generate and present the cyber health dashboard interface on user device 517. The cyber health dashboard may include a summary of all of the critical issues and/or potential risks that are associated with BMS 400. An administrator may select tabs and/or dropdown menus of the cyber health dashboard to view more specific information about the cybersecurity of BMS 400 (e.g., information about specific user accounts or servers, information in specific time frames, particular areas of weakness to a cyber-attack, etc.). User interface generator 526 may be implemented as a webserver that can store, process, and deliver web pages (e.g., HTML documents) to a web browser of user device 517, for example.

Setting updater 528 may be configured to change settings of user accounts and network devices upon receiving an input from an administrator (e.g., in response to a policy recommendation). In some cases, the input is to update settings associated with all user accounts of BMS 400. In these cases, setting updater 528 may process each user account of BMS 400 to update the settings based on the user input. In some cases, the input is to update settings associated with a group of user accounts (e.g., one or more user accounts). Setting updater 528 may process each user account of a group of user accounts and update the settings of the user accounts based on the input.

In some embodiments, setting updater 528 automatically updates the settings of user accounts and/or servers when a critical issue or a potential risk is identified. Setting updater 528 may update the settings by identifying one or more settings associated with potential risks or critical issues, identifying a new setting or set of settings from a database that includes settings that an administrator has labeled as compliant with cybersecurity standards, and updating (e.g., replacing) the one or more settings associated with the potential risks or critical issues with the compliant new setting or set of settings. In some embodiments, setting updater 528 updates the settings based on settings associated with a policy recommendation. Setting updater 528 may identify the settings associated with an identified policy recommendation and automatically update the settings.

It should be noted that cyber health management system 504 may also operate to provide cyber health information and give administrators the ability to change settings and various other configurations for network devices associated with BMS 400 including third party building devices connected to BMS 400, and related network or system configurations and settings. Further, the information about the various devices and other components may further include information about a Ring Manager (e.g., security risks associated with a Media Redundancy Manager in a Media Redundancy Protocol), BACnet SC configurations (e.g., security risks in devices, such as a BACnet router, in a BACnet system), configurable file (e.g., security risks associated with computer files in a BMS), etc.

Figure 6:
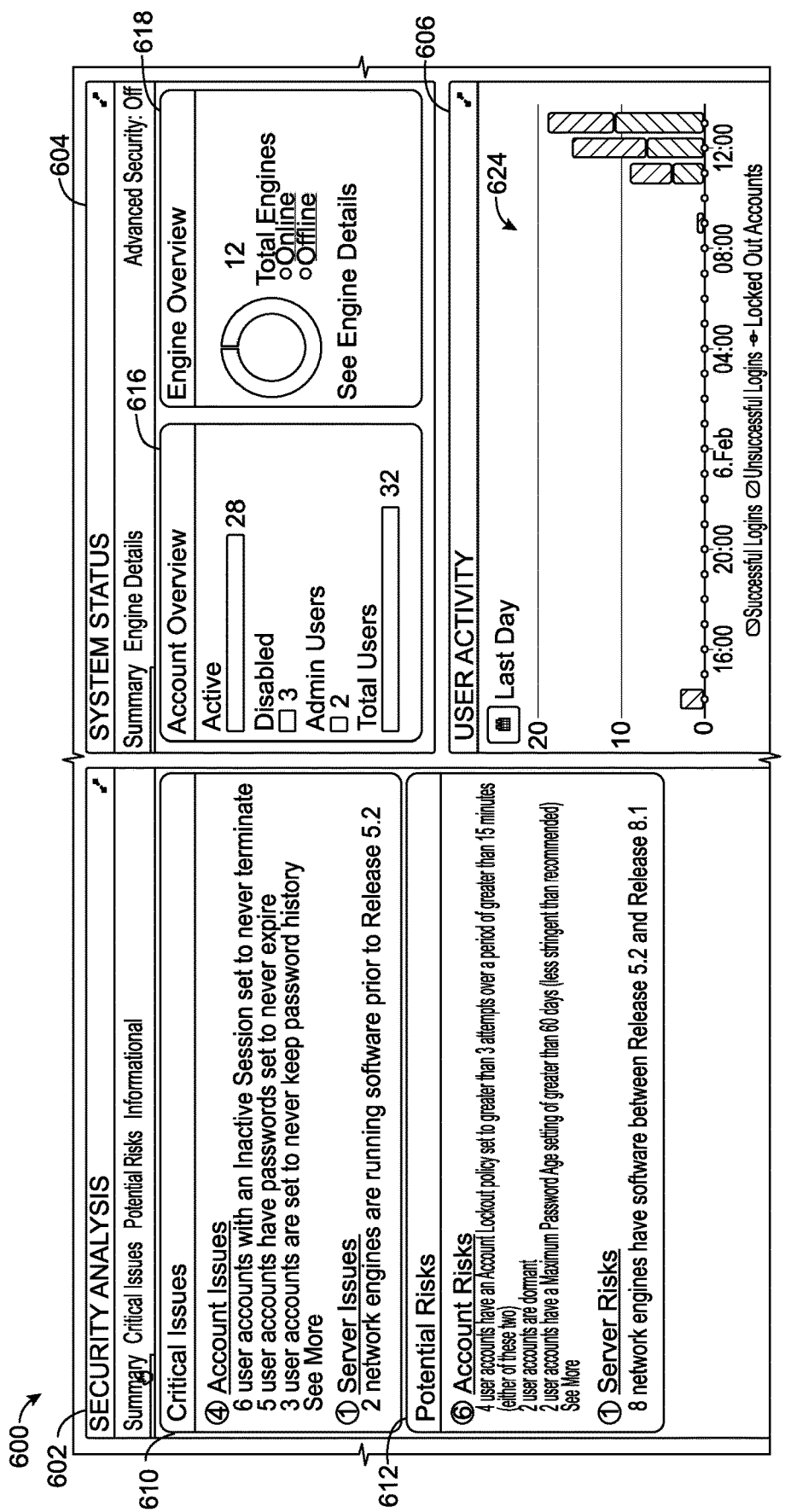
FIG. 6 is a drawing of an example cyber health summary interface associated with the cyber health management system of FIG. 5, according to some embodiments.

Referring generally to FIGS. 6-22, various example user interfaces associated with BMS 400 and cyber health management system 504 are shown, according to various embodiments. The interfaces shown in FIGS. 6-22 are generally associated with the cyber health dashboard interface as described above. Referring specifically to FIG. 6, an example cyber health summary interface 600 is shown, according to some embodiments. Interface 600 is shown to include a summary of information (e.g., critical issues, potential risks, informational, etc.) related to user accounts and servers of BMS 400. Interface 600 is shown to include security analysis section 602, system status section 604, and user activity section 606. An administrator can view the information presented in components 602-606 to identify and mitigate risks related to cybersecurity in BMS 400.

Security analysis section 602 includes a critical issues summary 610 including critical issues that are currently present in BMS 400. Critical issues summary 610 may include a summary of critical issues associated with user account issues, server issues, etc. as identified by evaluator 522. Critical issues may be top priority issues that potential hackers could easily exploit to access BMS 400. Examples of user account critical issues may include, but are not limited to, user accounts that have an inactive session set to never terminate, user accounts that have passwords set to never expire, user accounts that are set to never keep password history, etc. Cyber health management system 504 may identify each of these issues by evaluating the settings of user accounts in security database 530. Critical issues summary 610 may also show a number of user accounts and/or servers that are associated with particular critical issues.

Critical issues summary 610 may also include information about critical issues related to network devices. Examples of such critical issues may include, but are not limited to, servers that are running an old version of software, servers that are offline when they are scheduled to be online, servers that are offline, servers that are infected with a virus, etc. As with the critical issues related to user accounts, critical issues summary 610 may include a number of network devices that are experiencing the respective critical issues being presented on the cyber health dashboard interface.

Security analysis section 602 may also include a potential risks summary 612 including potential risks that are currently present in BMS 400. Potential risks may be issues with settings or configurations of user accounts or servers that are less severe than the critical issues described above, but that an administrator may still wish to address. As shown in interface 600 and described in further detail below, examples of user account potential risks include, but are not limited to, users accounts that have an account lockout policy set to greater than three attempts over a period of greater than 15 minutes, dormant user accounts, user accounts that have a maximum password age setting of greater than 60 days, etc. Interface 600 may also display a number of user accounts that are experiencing each respective potential risk.

Administrators can set thresholds for each potential risk that must be met for the potential risk to be displayed on the cyber health dashboard interface. For example, an administrator can set a threshold for a number of failed login attempts before a user will be locked out of their user account and another threshold for a lockout time (e.g., a time period for how long a user account will remain locked out when a user exceeds the threshold for failed login attempts). If corresponding settings of a user account exceed either threshold, a potential risk associated with the threshold may be presented on the cyber health dashboard. In another example, an administrator can set a maximum password age threshold. If a user account has a maximum password age that exceeds the threshold, a potential risk associated with the user account may be presented on the cyber health dashboard. In yet another example, an administrator may set a threshold for an inactive session period. If a user account has an inactive session period that exceeds that fourth threshold, a potential risk associated with the user account and the setting may appear on the cyber health dashboard.

In another example, an administrator can set a time threshold for a time that a user does not log into a user account before the account is considered dormant. The dormancy of the account may be displayed as a potential risk on the cyber health dashboard interface. Cyber health management system 504 may identify user accounts that are not logged in to BMS 400 and keep track of an amount of time since the user account's last login. Once cyber health management system 504 determines a user account has not been logged in for a time exceeding a threshold, cyber health management system 504 may identify the user account as dormant and determine its dormancy as a potential risk by comparing the time threshold to a look-up table of security database 530 and determining that dormant accounts are potential risks.

Potential risks summary 612 may also include information about potential risks associated with servers and other network devices of BMS 400. Examples of server potential risks include, but are not limited to, servers that have outdated software, servers without antivirus software, open network ports, servers without any data backups, duplicate IP addresses, Dynamic Host Configuration Protocol (DHCP) is enabled when a network does not have any DHCP servers, a server is connected to an insecure VPN, etc. Interface 600 may display a number of servers that are experiencing each potential risk.

System status section 604 is shown to include a user account overview 616 and a network device overview 618. User account overview 616 may include information about a number of user accounts that are associated with BMS 400 and a status of such user accounts. For example, the user accounts shown in user account overview 616 may include all user accounts in a directory of BMS 400. User account overview 616 may include information about the number of active and disabled user accounts associated with BMS 400 along with a number of admin user accounts and a total number of user accounts. User account overview 616 may also include a number of user accounts in various roles such as maintenance, administrative, operator, and user. Cyber health management system 504 may process and analyze the user accounts of BMS 400 to determine a status of each user account.

Network device overview 618 may include information detailing a status of each network device associated with BMS 400. Network device overview 618 is shown to display the information via a graph displaying a number of servers that are online or offline. Network device overview 618 may display any state of the servers of BMS 400 (e.g., standby). Network device overview 618 may also display a total number of servers that are associated with BMS 400. Data for each server may be stored in a database (e.g., security database 530).

Administrators may also be presented with an option to see server details. Selection of the option to see server details may prompt interface 600 to display details about each individual engine that is associated with BMS 400 and/or a pop-out display that shows the same information. By providing the administrator with various options without displaying information all at once, administrators can determine information that they wish to view without being burdened by too much information at one time.

User activity section 606 may include a graph 624 displaying user login activity. Graph 624 may display a number of successful logins, unsuccessful logins, and/or locked out accounts of BMS 400 within a set time interval. An administrator can select a time interval (e.g., last week, last month, last year) to view user activity that occurs within the time interval. An administrator can interact with user activity section 606 by selecting various types of information to view (e.g., successful logins, unsuccessful logins, locked out accounts) and information that the administrator does not wish to view. Further, the administrator can zoom in on graph 624 to more easily see how many user accounts are associated with each category.

Figure 7:
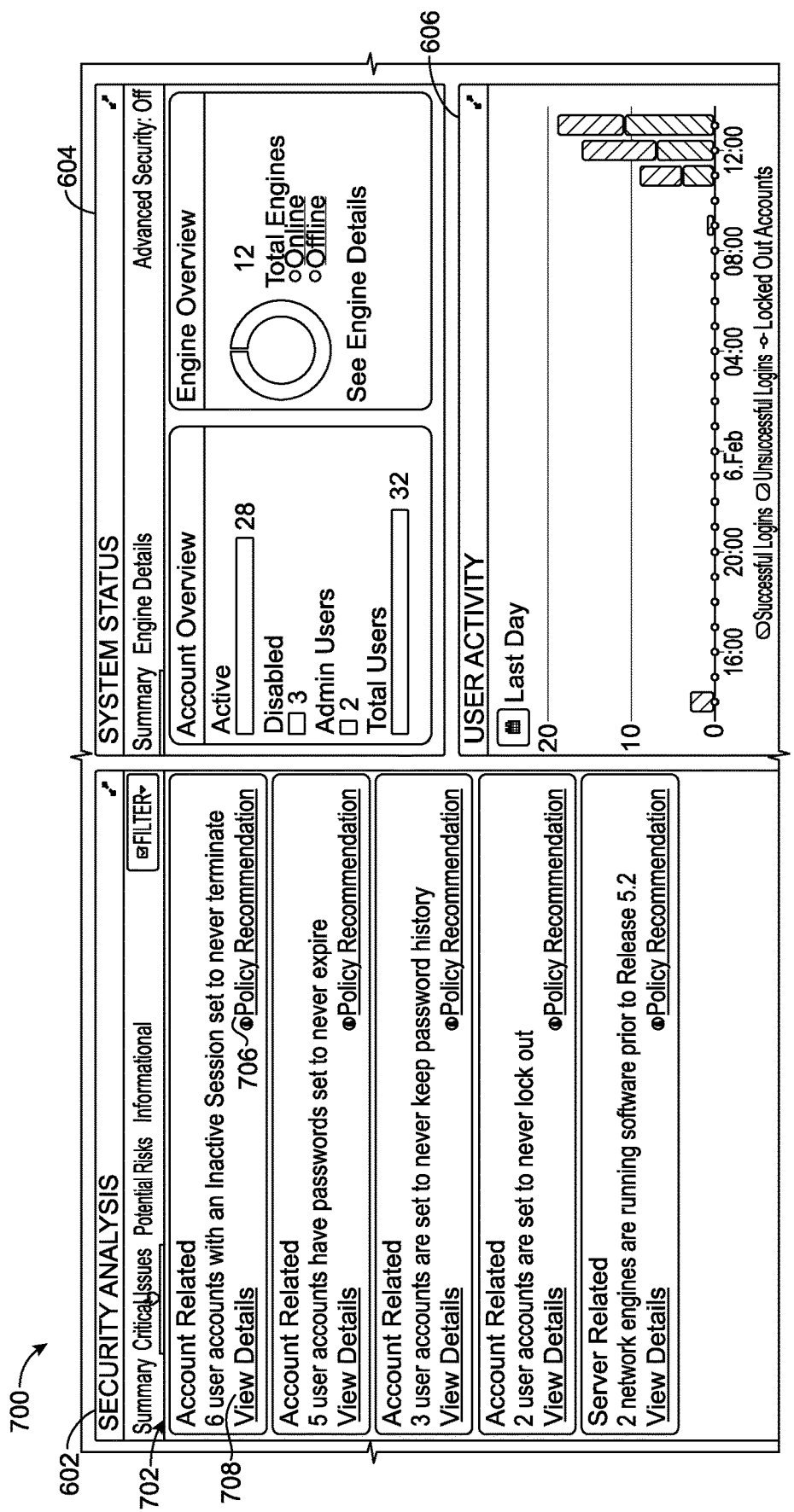
FIG. 7 is a drawing of an example critical issues interface associated with the cyber health management system of FIG. 5, according to some embodiments.
Figure 8:
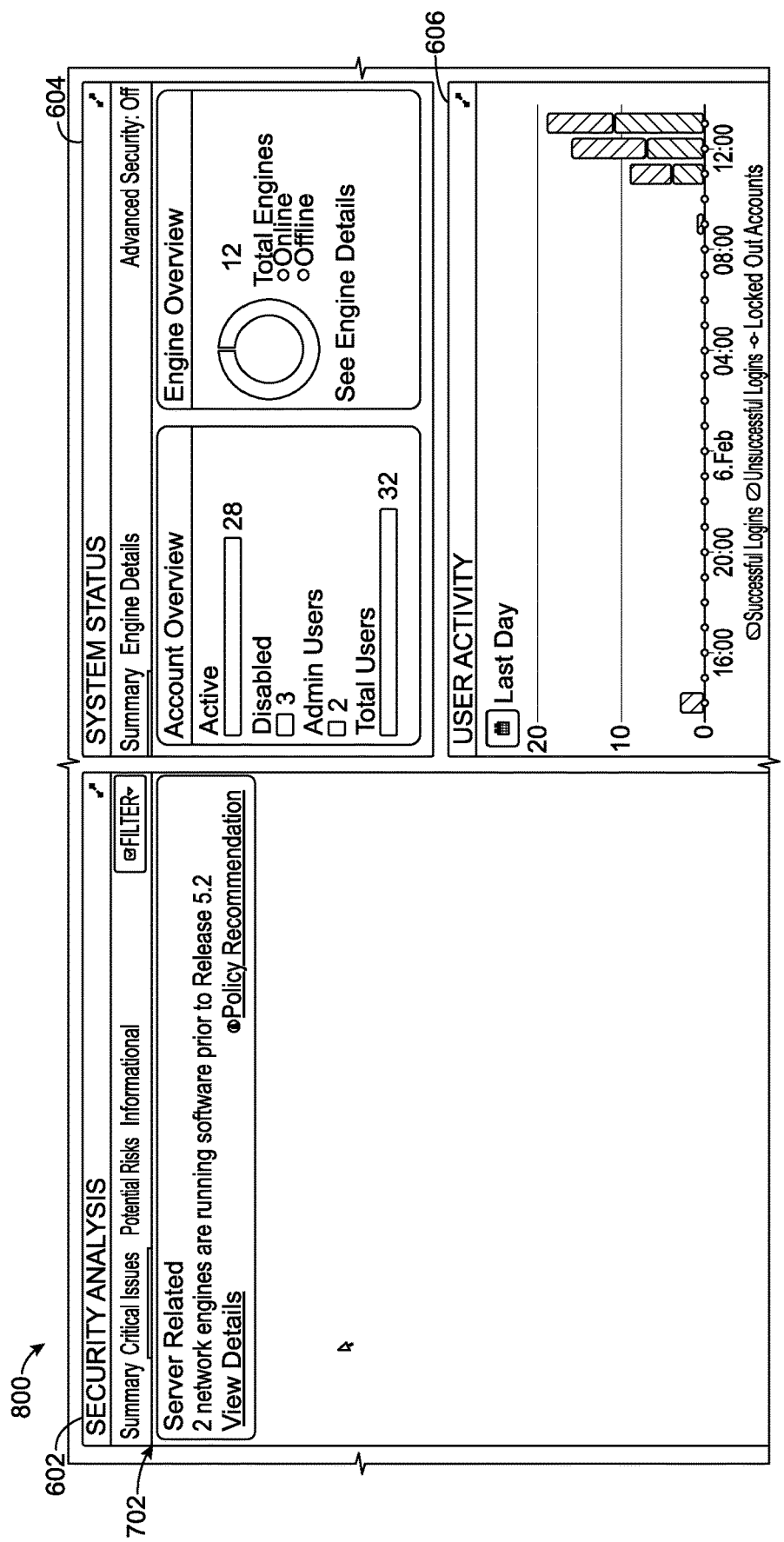
FIG. 8 is a drawing of another example critical issues interface associated with the cyber health management system of FIG. 5, according to some embodiments.

Referring specifically to FIG. 7, an example critical issues interface 700 is shown, according to some embodiments. Interface 700 is shown to include a critical issue list 702 that shows the user critical issues associated with user accounts and network devices of BMS 400. As shown, examples of critical issues that can be included in critical issue list 702 may include, but are not limited to, user accounts with an inactive session set to never terminate, user accounts that have passwords set to never expire, user accounts that are set to never keep password history, user accounts that are set to never lock out, servers that are running old software, etc. Each critical issue may be associated with a policy recommendation (e.g., policy recommendation 706) and details (e.g., details 708). The policy recommendation and the details may be specific to the issue that they are associated with. For example, policy recommendation 706 and details 708 may be associated with an account related critical issue indicating that six user accounts are associated with an inactive session that is set to never expire as shown in interface 700. Policy recommendation 706 may include a policy recommendation indicating how to resolve the critical issue while details 708 may include information about the user accounts associated with the issue. Administrators may view the policy recommendation and details to identify the best course of action to resolve the critical issue. Policy recommendations and details will be described in greater detail below.

To view and organize the information in critical issue list 702, an administrator may filter critical issue list 702 to include information specific to user accounts or network devices. Consequently, if there is a long list of user account issues or server issues, the administrator can easily see the critical issues that the administrator wishes to resolve. For example, referring specifically to FIG. 8, an example critical issues interface 800 filtered to show only server-related information is shown, according to some embodiments.

Figure 9:
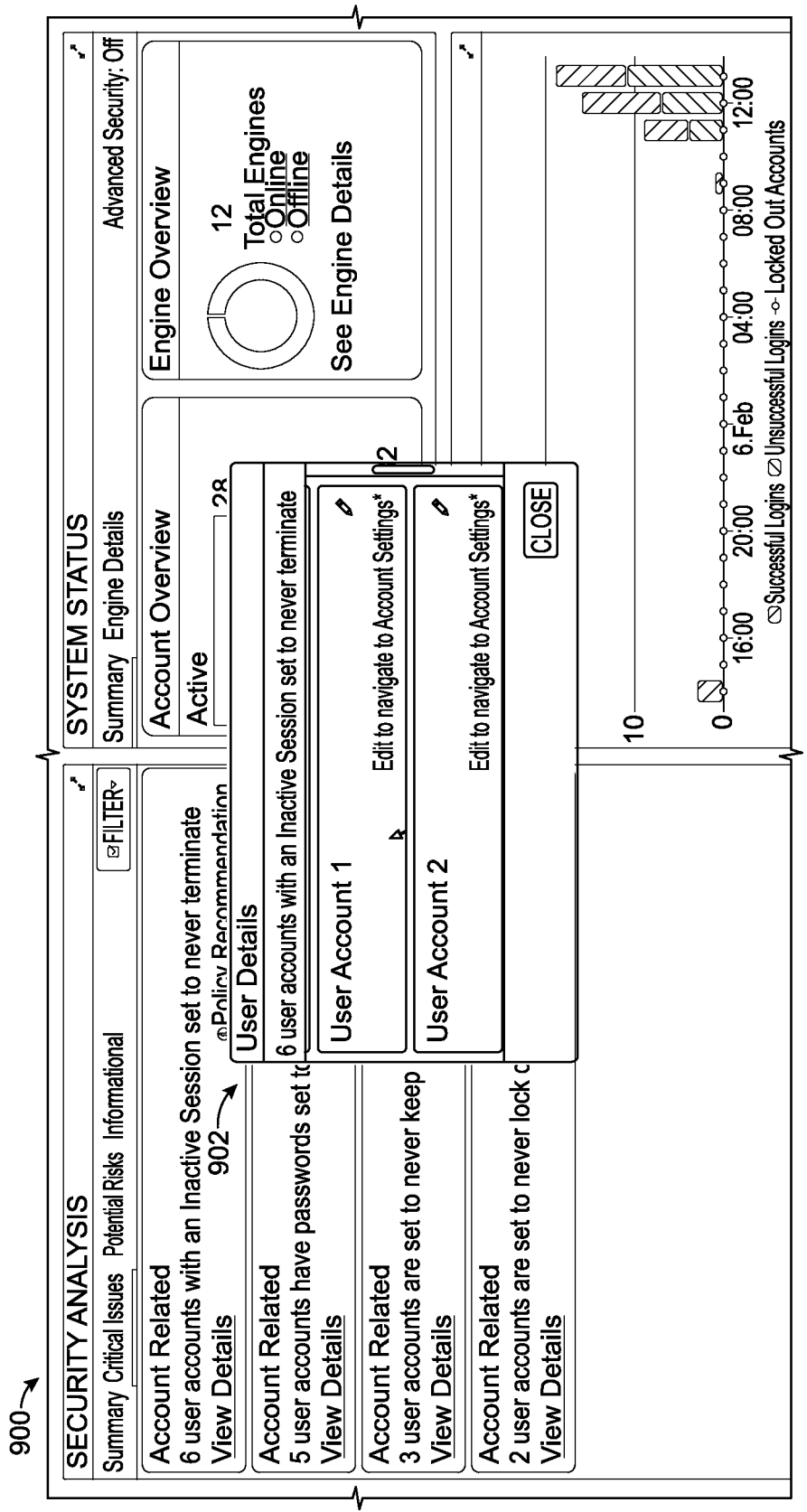
FIG. 9 is a drawing of a user details interface associated with the cyber health management system of FIG. 5, according to some embodiments.

Referring specifically to FIG. 9, an example user details interface 900 associated with is shown, according to some embodiments. Interface 900 is shown to include an example user details dialog box 902. User details dialog box 902 may be displayed via the user interface upon selection of a details button (e.g., details 708) associated with a critical issue. User details dialog box 902 may include a list 904 of user accounts or servers that are experiencing the critical issue. An administrator may select an option for each user account to navigate to (e.g., view) a user account page and edit account settings for the user account.

For example, as shown in interface 900, list 904 may be associated with user accounts experiencing an inactive session that is set to never terminate. As shown, list 904 may include a user account 906 that is associated with an edit account settings option 908. An administrator may select edit account settings option 908 to view account settings of user account 906. The administrator may adjust the settings of user account 906 so inactive sessions of user account 906 may terminate according to an administrative set policy (e.g., after five minutes).

Figure 10:
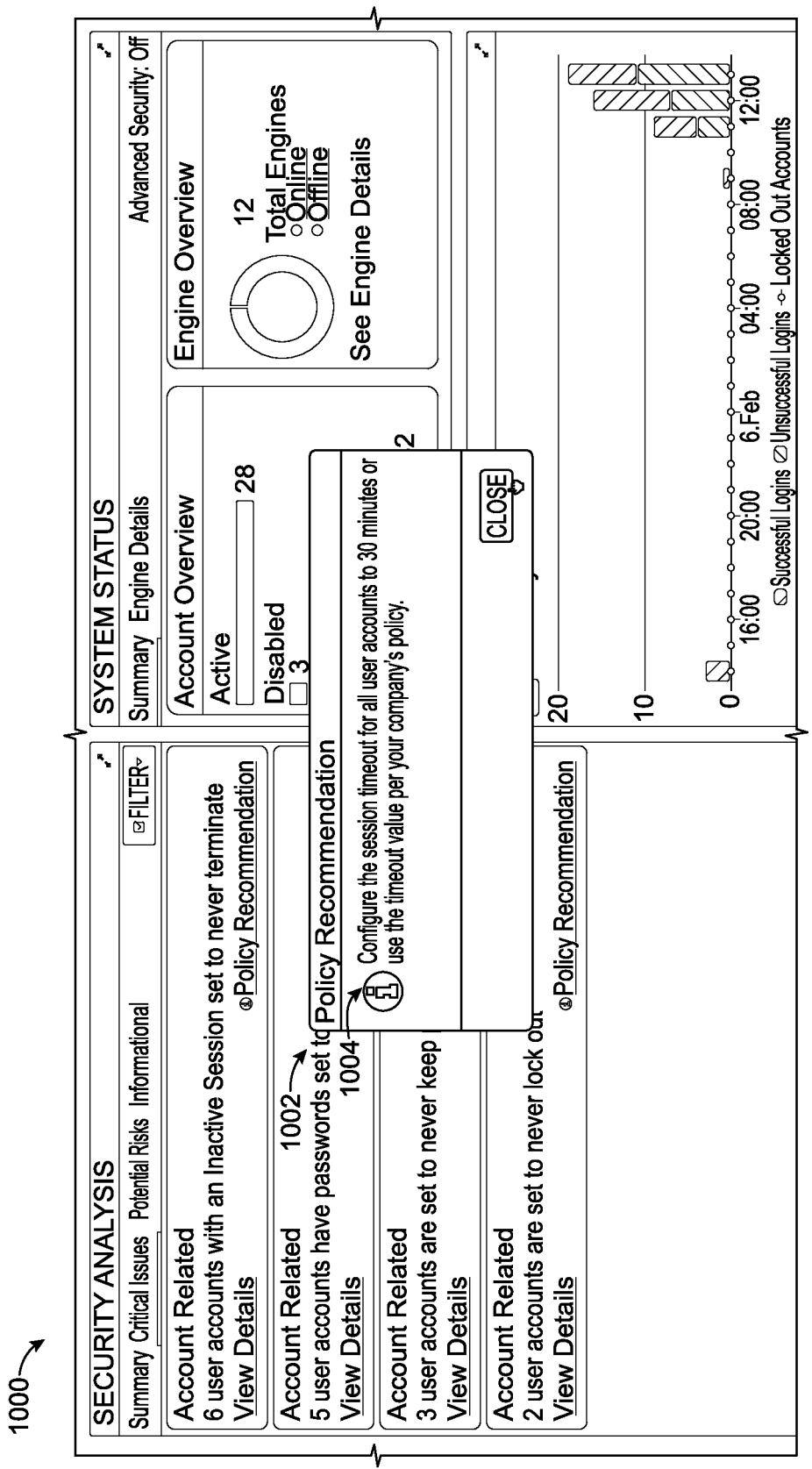
FIG. 10 is a drawing of an example policy recommendation interface associated with the cyber health management system of FIG. 5, according to some embodiments.

Referring specifically to FIG. 10, an example policy recommendation interface 1000 is shown, according to some embodiments. Interface 1000 is shown to include an example policy recommendation dialog box 1002. Policy recommendation dialog box 1002 may be displayed when an administrator selects policy recommendation 706 or another policy recommendation generated and presented on the cyber health dashboard interface. Policy recommendation dialog box 1002 may include a policy recommendation 1004.

Policy recommendation 1004 may include text that describes a solution to resolve a critical issue associated with the policy. Administrators may set policies for various user accounts. For example, as shown in interface 1000, policy recommendation 1004 includes text reciting, "configure the session timeout for all user accounts to 30 minutes or use the timeout value per your company's policy." An administrator may view the policy and adjust settings of the user accounts associated with the issue or make a global change by configuring all user accounts based on policy recommendation 1004.

Each issue of critical issue list 702 may be associated with a unique policy recommendation directed to solving the issue. For example, critical issue list 702 may include a list of different critical issues. Each issue may be associated with a different policy recommendation. An administrator may view policy recommendations associated with each critical issue to determine how to adjust the settings that are associated with the critical issue. The administrator viewing the user interface may choose to act based on the policy recommendation that they view.

Figure 11:
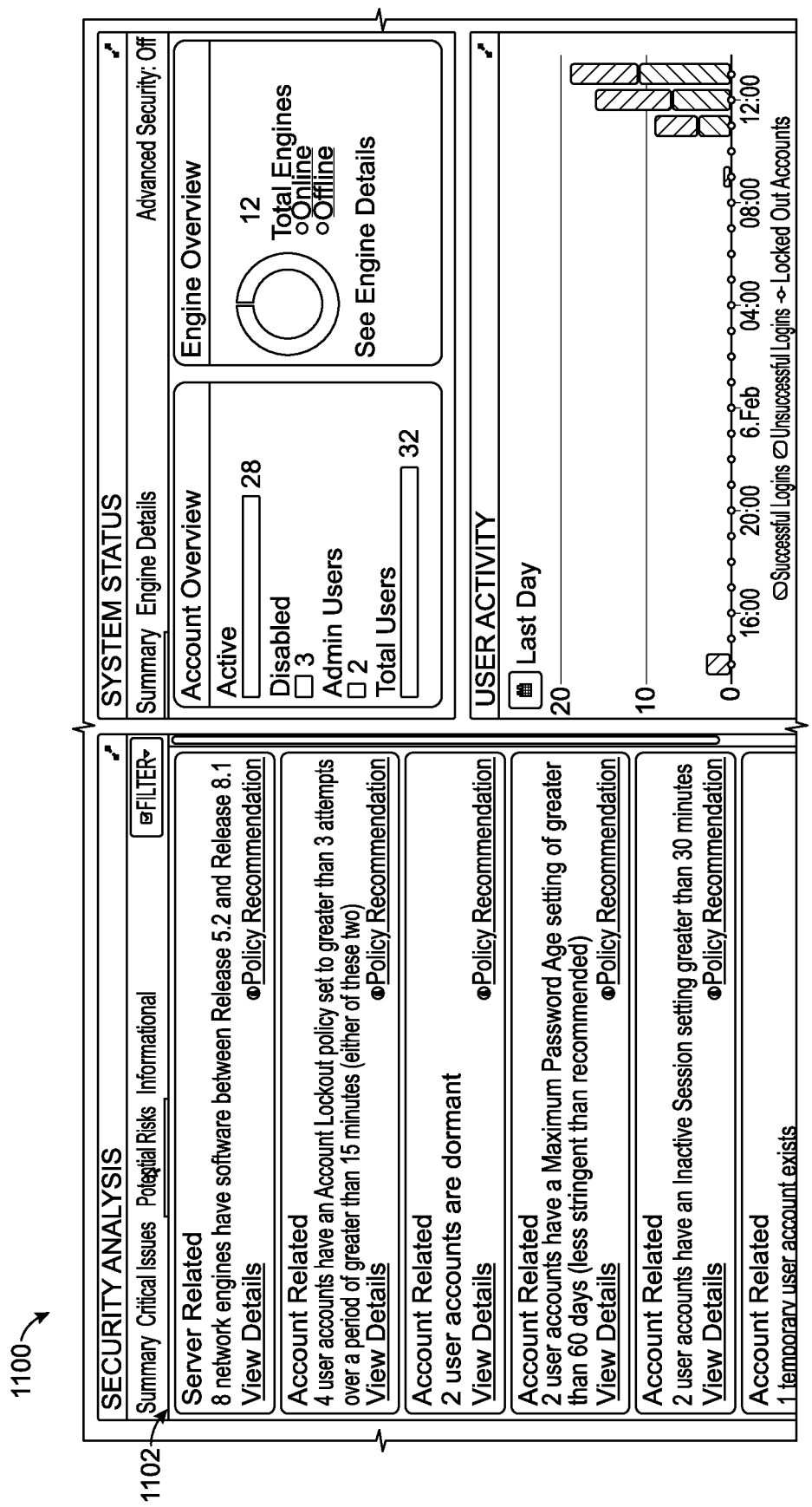
FIG. 11 is a drawing of an example potential risks interface associated with the cyber health management system of FIG. 5, according to some embodiments.

Referring specifically to FIG. 11, an example potential risks interface 1100 is shown, according to some embodiments. An administrator may interact with potential risks interface 1100 to see any potential risks that are associated with user accounts and network devices of BMS 400. Potential risks may be cybersecurity issues associated with various user accounts and servers that an administrator of BMS 400 has determined are less severe than the critical issues as described above. Examples of potential risks may be shown in a potential risk list 1102. Potential risk list 1102 is shown to include example potential risks such as, but not limited to, servers that have old software, user accounts that have an account lockout policy set to greater than three attempts over a period of greater than 15 minutes, user accounts that are dormant, user accounts that have a maximum password age setting of greater than 60 days, user accounts that have an inactive session setting greater than 30 minutes, temporary user accounts that exist, etc. An administrator can view any potential risks associated with BMS 400 at interface 1100 and view policy recommendations including settings that would resolve each potential risk in a similar manner to how the administrator can resolve critical issues. Based on the policy recommendations and using the cyber health dashboard interface, the administrator may adjust the settings of the user accounts or servers experiencing the issue.

Advantageously, the cyber health dashboard interface can enable an administrator to easily view any issues associated with user accounts and network devices that could allow a malicious party to hack into BMS 400 to obtain data or otherwise interact with BMS 400. The cyber health dashboard may group the issues (e.g., into potential risks and critical issues) based on severity so the administrator can easily identify which issues to address and/or whether the issues need to be addressed at all. Finally, the cyber health dashboard may provide the administrator with the ability to change the settings of the user accounts or servers of the issues via the same interface that shows the issues that need addressing.

Figure 12:
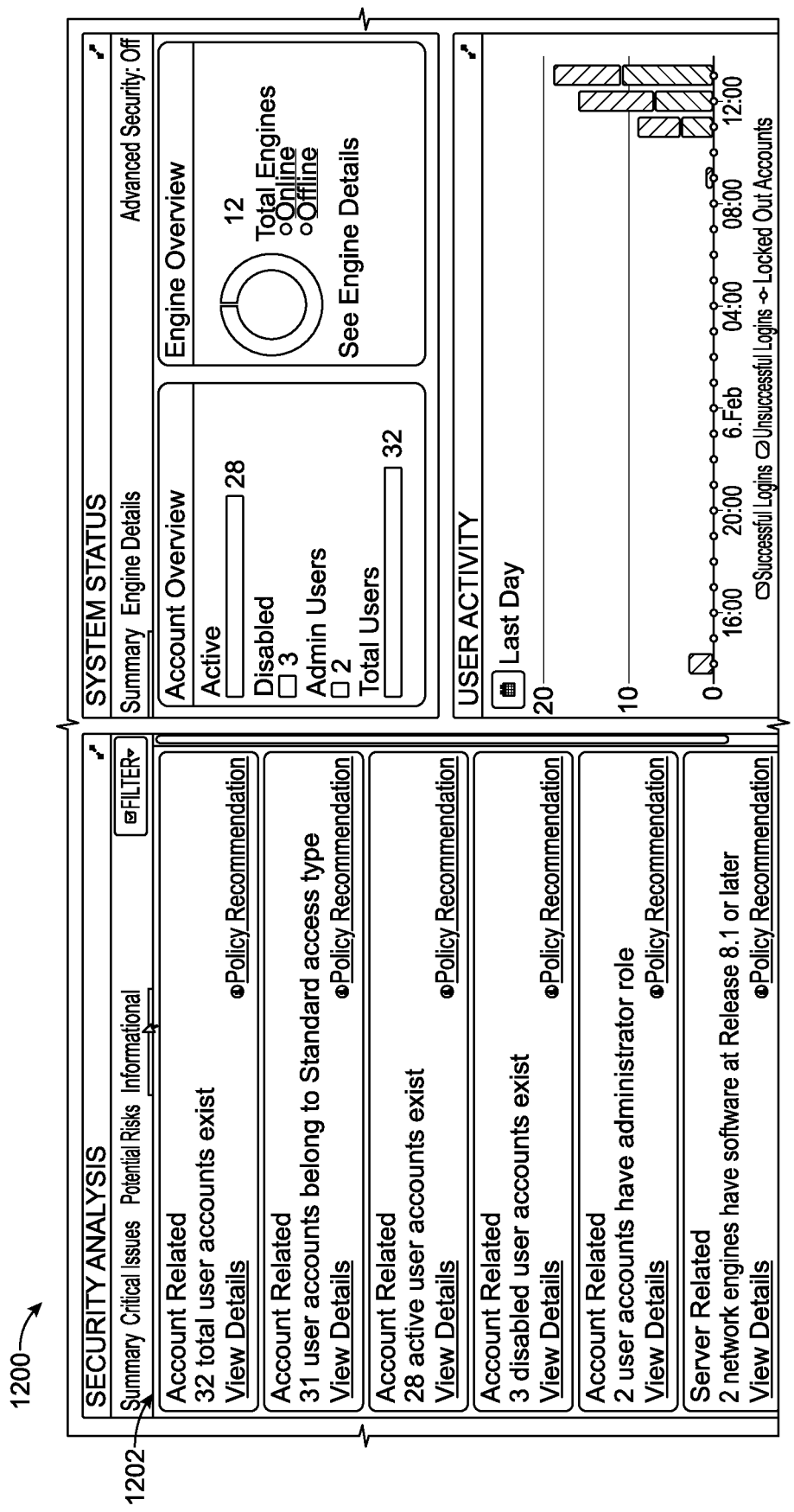
FIG. 12 is drawing of an example informational interface associated with the cyber health management system of FIG. 5, according to some embodiments.

Referring specifically to FIG. 12, an example informational interface 1200 is shown, according to some embodiments. In addition to showing cybersecurity problems of the BMS 400, the cyber health dashboard may show other information about BMS 400. For example, interface 1200 is shown to include an information list 1202. Information list 1202 may include a list of items detailing information about user accounts and servers of BMS 400. Information list 1202 may include information details such as, but not limited to, total user accounts that exist, user accounts that belong to a standard access type, active user accounts, disabled user accounts, user accounts that have an administrator role, and servers that have a current software model. An administrator can organize and view various information similar to how the administrator could organize and view potential risks and issues related to critical issues and potential risks. While the information shown in interface 1200 may be merely informative and not associated with a cybersecurity issue, different information may be associated with policy recommendations for actions an administrator may take regarding the information.

Figure 13:
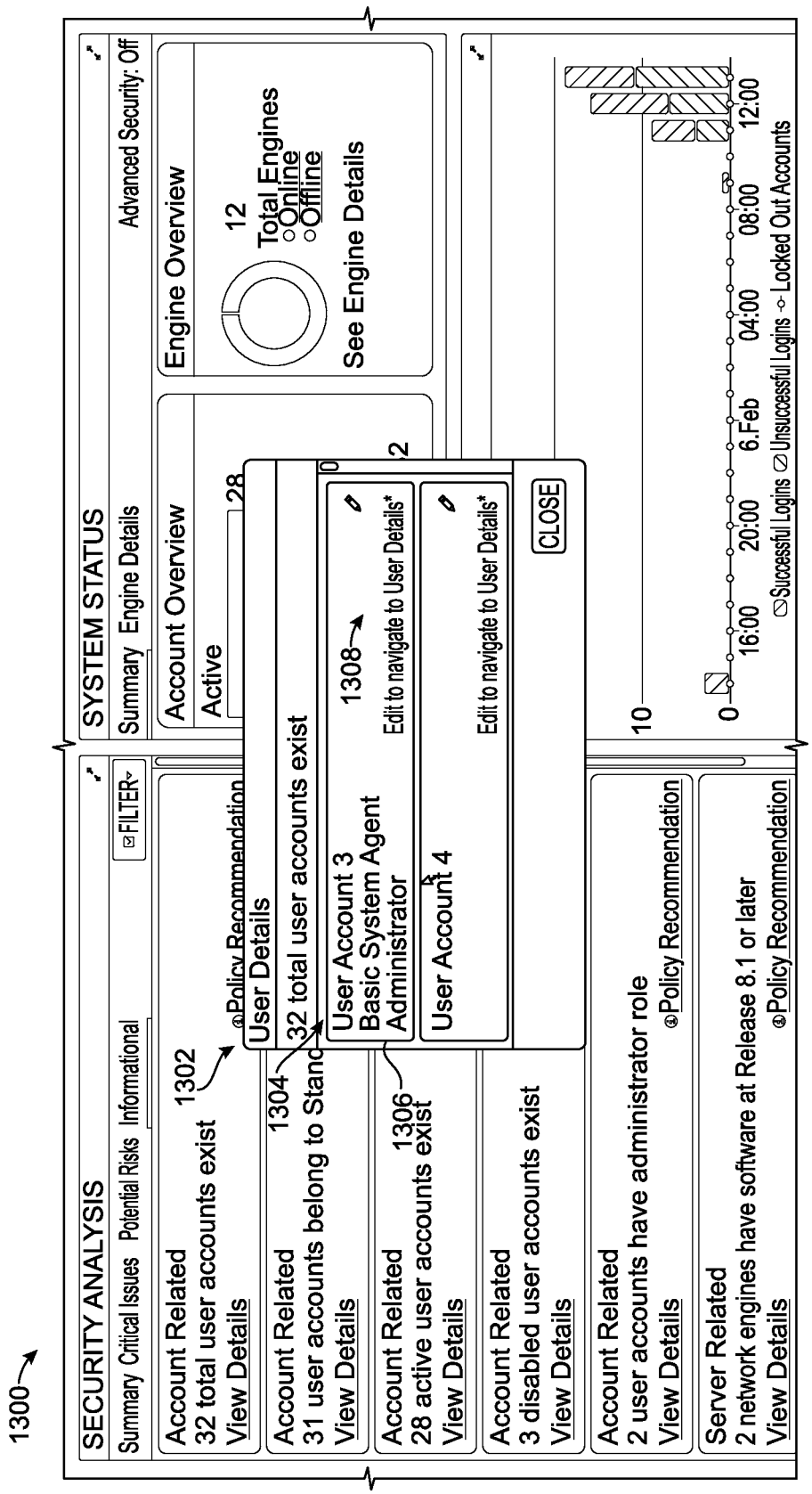
FIG. 13 is drawing of another example user details interface associated with the cyber health management system of FIG. 5, according to some embodiments.

For example, referring specifically to FIG. 13, an example user details interface 1300 is shown, according to some embodiments. Interface 1300 may include user details associated with information from information list 1202. The user details may include a list 1304 of user accounts (e.g., user account 1306) or network devices that are associated with the information. An administrator may select an option (e.g., option 1308) to access details of the user accounts of the list. By selecting the option, the administrator can navigate to a user account page to view various details about the user account such as various attributes and settings that are associated with the user account.

Figure 14:
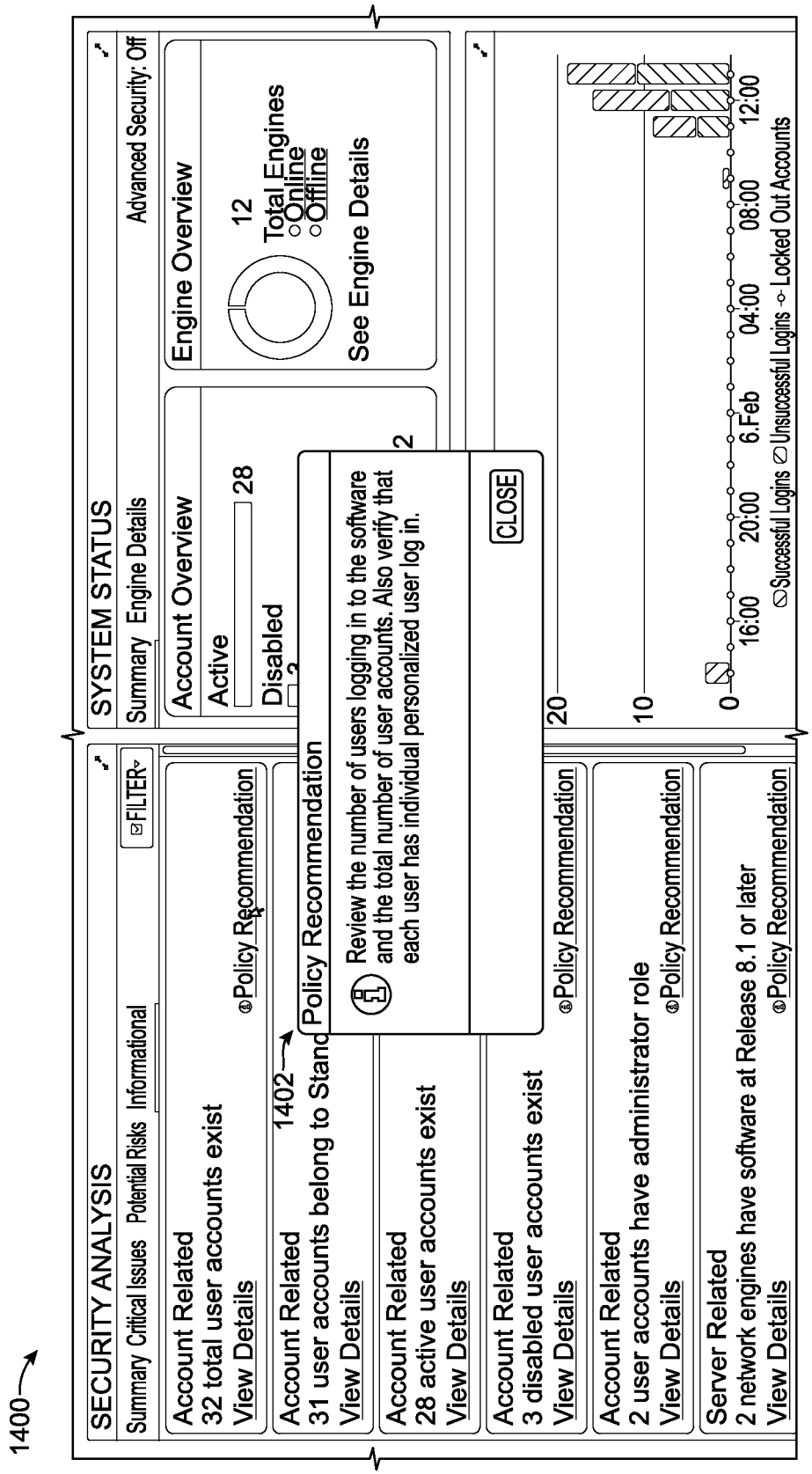
FIG. 14 is a drawing of another example policy recommendation interface associated with the cyber health management system of FIG. 5, according to some embodiments.

In another example, referring specifically to FIG. 14, an example policy recommendation interface 1400 is shown, according to some embodiments. Interface 1400 is shown to include a policy recommendation 1402 that recites: "Review the number of users logging in to the software and the total number of user accounts. Also verify that each user has individual personalized user login." An administrator may view policy recommendations and act accordingly. Different information of information list 1202 may have policy recommendations that are specific to the information.

Figure 15:
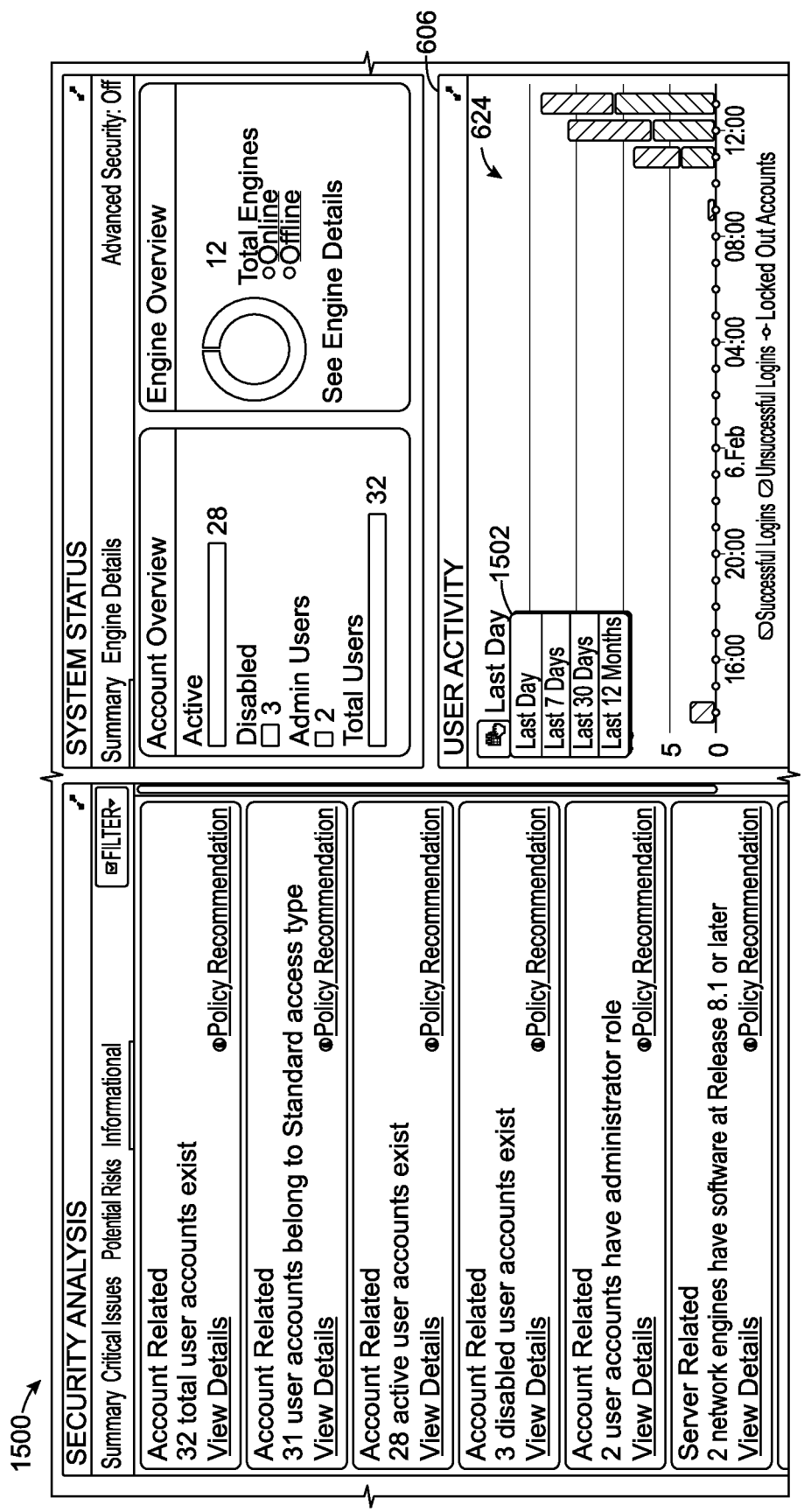
FIG. 15 is a drawing of an example user activity interface associated with the cyber health management system of FIG. 5, according to some embodiments.

Referring specifically to FIG. 15, an example user activity interface 1500 including a dropdown menu with various time frames is shown, according to some embodiments. Interface 1500 is shown to include a drop down menu 1502 which enables an administrator to view user activity from varying time intervals. An administrator may view drop down menu 1502 and select a time period from which to view data. As shown in interface 1500, examples of intervals include, but are not limited to, last day, last 7 days, last 30 days, last 12 months, etc. Upon selection of one of the intervals, graph 624 may change to reflect the selected interval. For example, if an administrator selects a last 7 days interval, graph 624 may display user activity data from the last 7 days.

Figure 16:
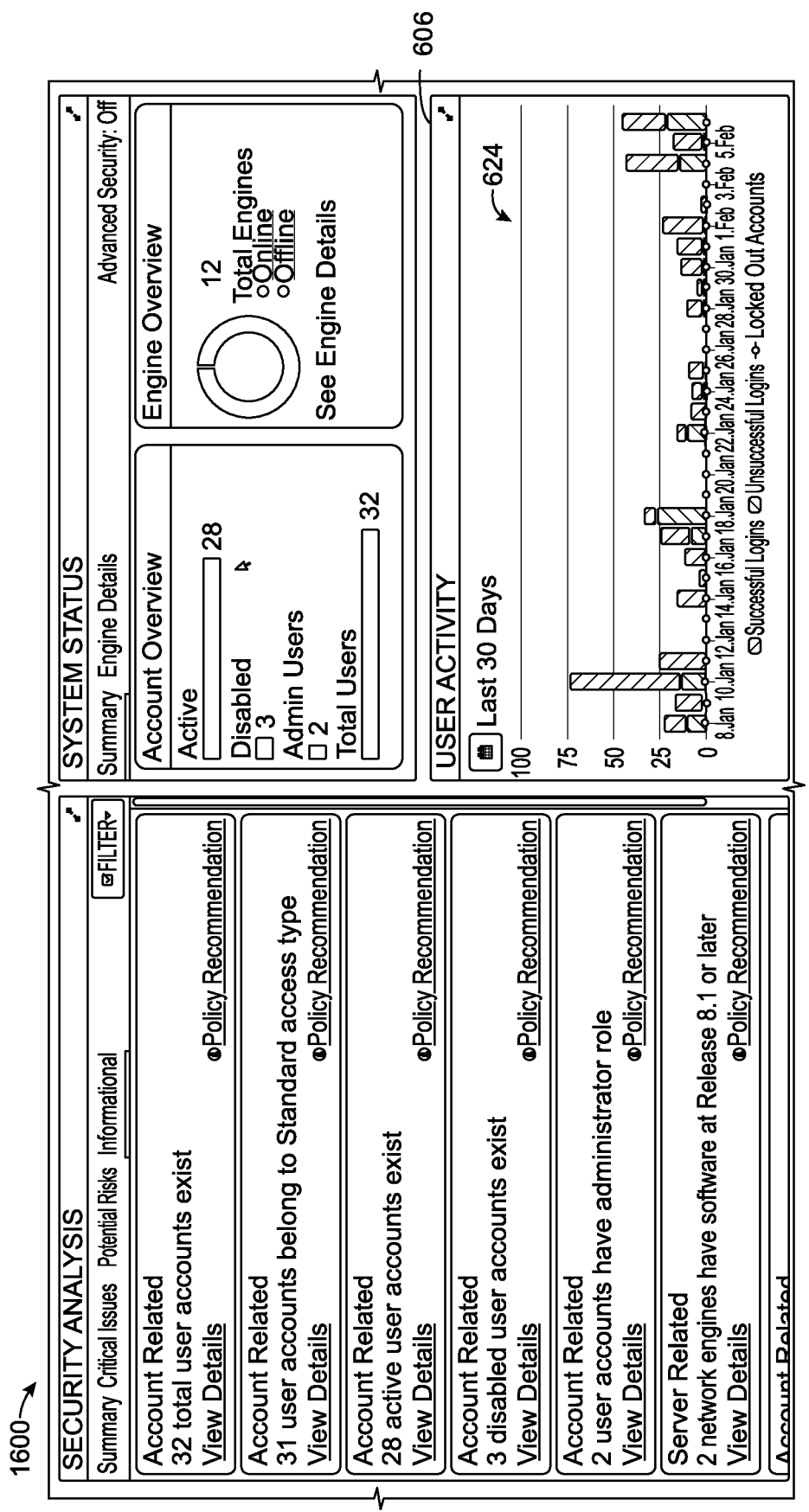
FIG. 16 is a drawing of another example user activity interface associated with the cyber health management system of FIG. 5, according to some embodiments.

Referring specifically to FIG. 16, another example user activity interface 1600 including user activity information from the previous 30 days is shown, according to some embodiments. An administrator may select a last 30 day interval from drop down menu 1502, for example. Upon selection of the 30 day interval, graph 624 may display data corresponding to user login activity within the last 30 days. As displayed, graph 624 may show a number of successful logins, unsuccessful logins, and locked out accounts for each day of the last 30 days.

Figure 17:
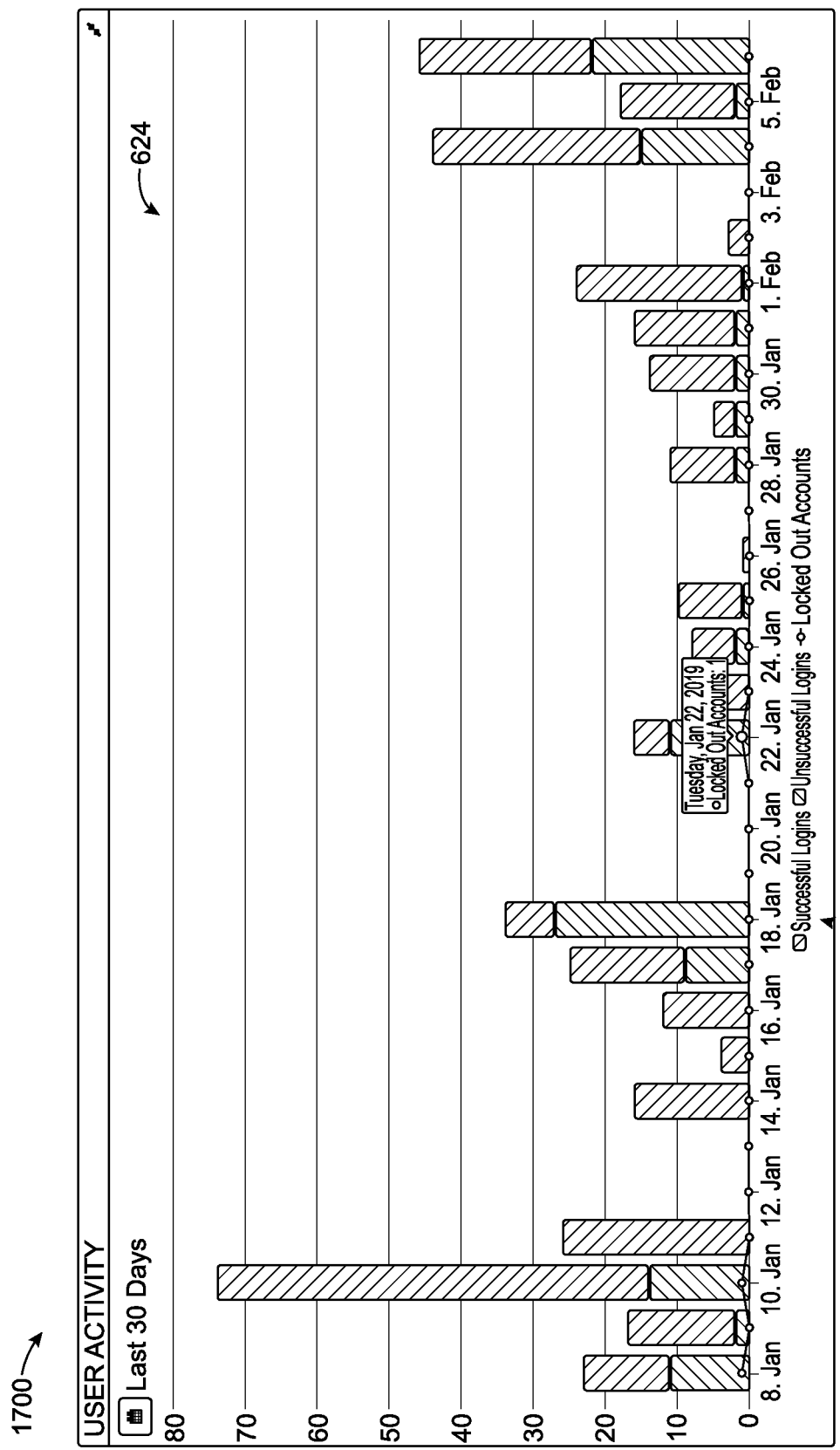
FIG. 17 is a drawing of an example user login graph interface associated with the cyber health management system of FIG. 5, according to some embodiments.

For example, referring specifically to FIG. 17, an example user login graph interface 1700 is shown, according to some embodiments. Interface 1700 is shown to include a magnified view of graph 624 including data from the last 30 days. The magnified view may show the data in more detail with smaller intervals on the y-axis. An administrator may view the exact amount of successful logins, unsuccessful logins, and locked out accounts that are associated with BMS 400 by selecting or hovering over any of the days of graph 624. For example, as shown in interface 1700, an administrator may put a cursor over the locked out accounts data of graph 624 for January 22 and see that one user account was locked out on January 22. The administrator may view data associated with any of successful logins, unsuccessful logins, and/or locked out accounts.

Figure 18:
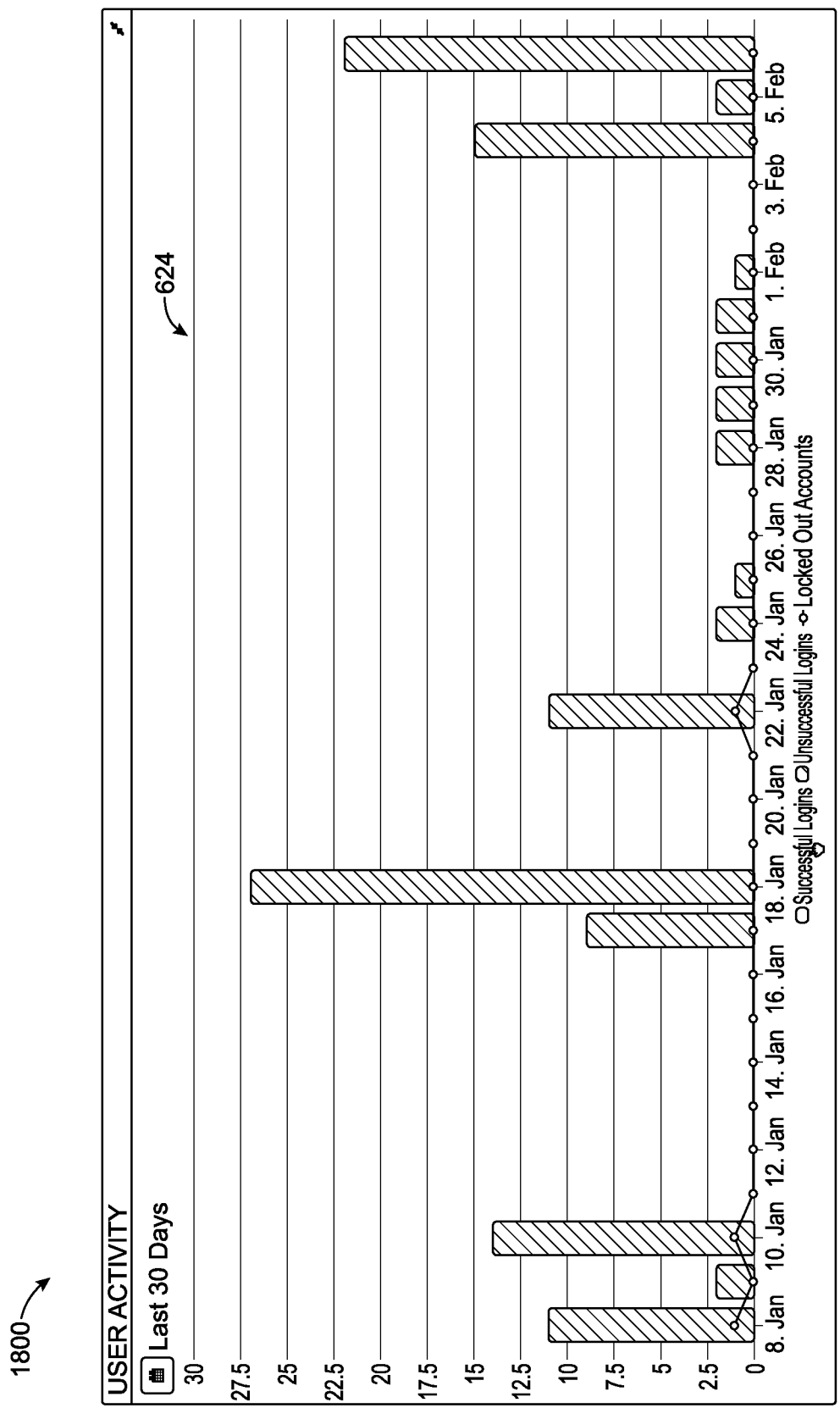
FIG. 18 is a drawing of another example user login graph interface associated with the cyber health management system of FIG. 5, according to some embodiments.

Referring specifically to FIG. 18, another example user login graph interface 1800 is shown, according to some embodiments. Interface 1800 shows an example of a modified view of graph 624. The modified view of graph 624 shown in interface 1800 may be a magnified view similar to shown in interface 1700, but the modified view of graph 624 shown in interface 1800 may only display data associated with unsuccessful logins and locked out accounts. Advantageously, administrators may narrow the data being displayed in graph 624. For instance, a user viewing graph 624 may more easily determine how many unsuccessful logins attempts there were within an interval (e.g., the last 30 days) without the data associated with successful login attempts changing a size of the intervals of the y-axis of graph 624.

Figure 19:
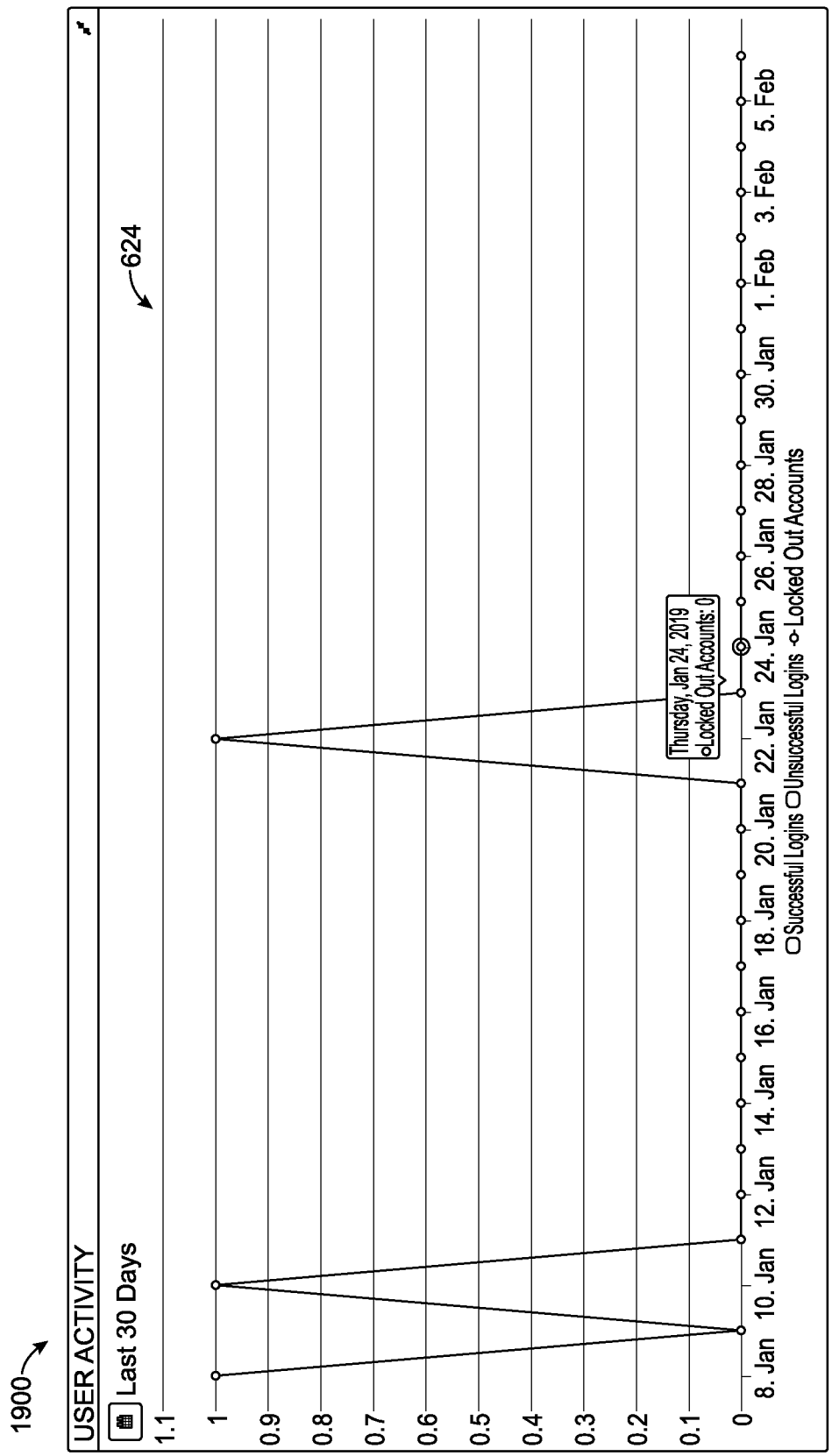
FIG. 19 is a drawing of another example user login graph interface associated with the cyber health management system of FIG. 5, according to some embodiments.

Referring specifically to FIG. 19, another example user login graph interface 1900 is shown, according to some embodiments. Interface 1900 shows another example of a modified view of graph 624. The modified display of graph 624 shown in interface 1900 may only include data related to the number of accounts that were locked out of BMS 400 on different days. As shown in interface 1900, this information may be presented as a line graph. However, the data may be displayed in any manner (e.g., a bar graph, a donut graph, a pie graph, etc.).

Figure 20:
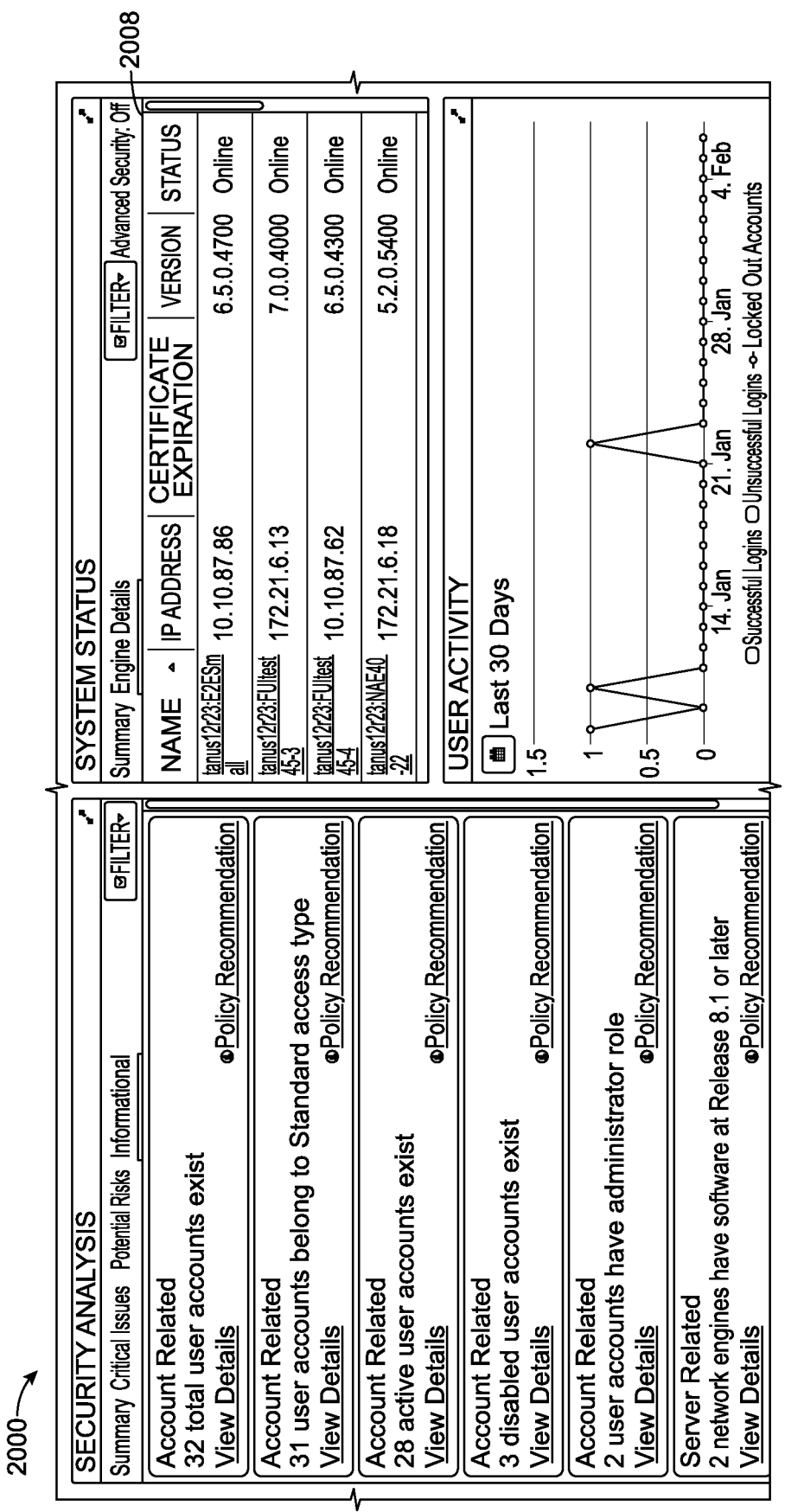
FIG. 20 is a drawing of an example system status interface associated with the cyber health management system of FIG. 5, according to some embodiments.

Referring specifically to FIG. 20, an example system status interface 2000 is shown, according to some embodiments. Interface 2000 is sown to include a list 2008 that shows servers and various details about each server. The details may include names of the servers, the IP addresses of the servers, dates that certificates of the servers expire (e.g., when each server's license to use software associated with BMS 400 expires), what firewall each is server is running, what versions of software each server is running, and an online/offline/standby status of each server. An administrator may select any of the servers on list 2008 to view more information about the selected server. An administrator may filter list 2008 based on different criteria (e.g., online, offline, location, etc.). The administrator may also filter list 2008 based on categories such as, but not limited to, name, IP address, certificate expiration, version number, status, etc.

Referring specifically to FIG. 21, another example system status interface 2100 is shown, according to some embodiments. Interface 2100 is shown to include a list 2102. List 2102 shows an example of a filtered version of list 2008 when filtered to only show servers with a status of online.

Figure 22:
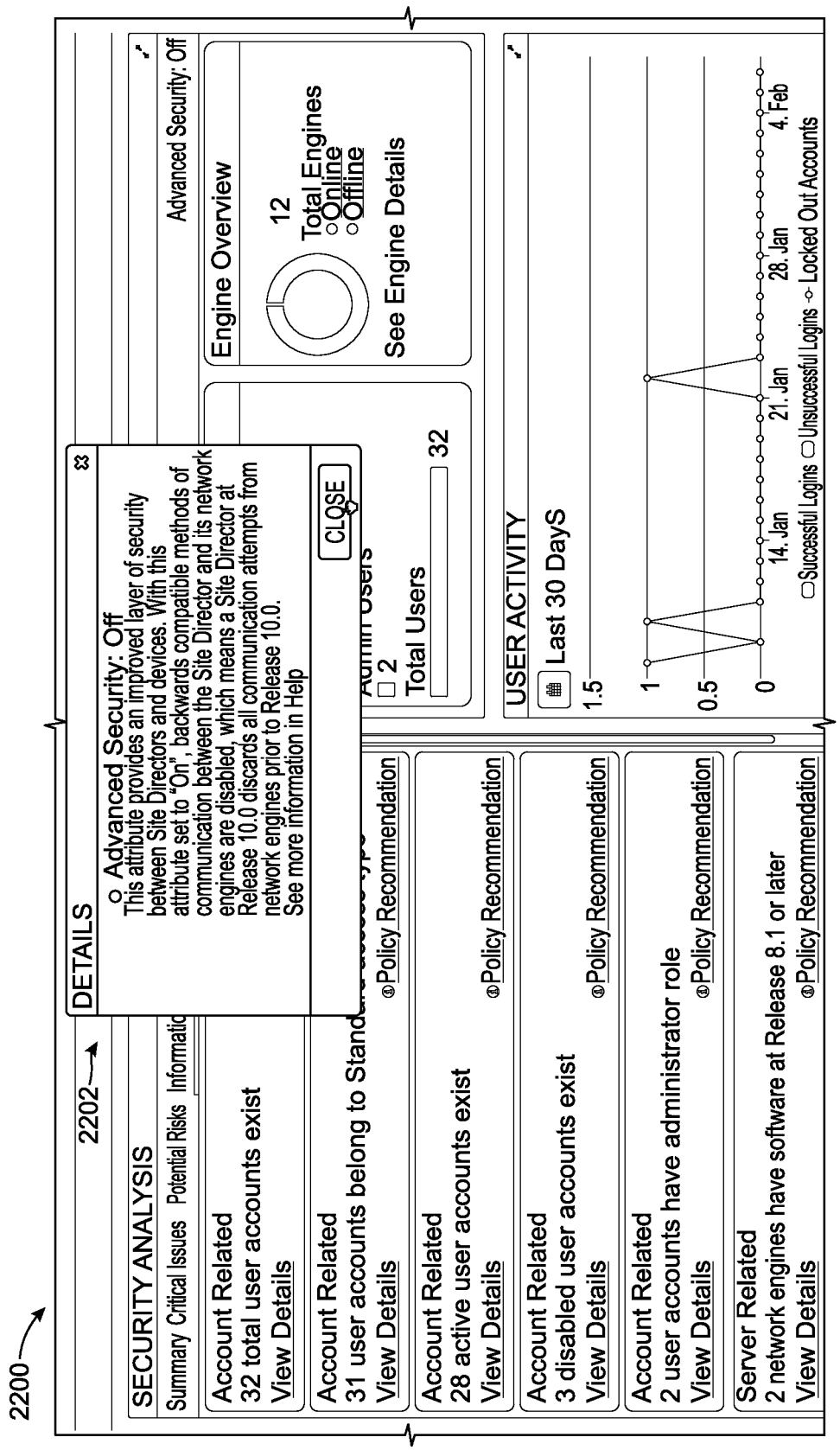
FIG. 22 is a drawing of an example advanced security interface associated with the cyber health management system of FIG. 5, according to some embodiments.

Referring specifically to FIG. 22, an example advanced security interface 2200 is shown, according to some embodiments. Interface 2200 is shown to include an advanced security status dialog box 2202. The advanced security status may include an indicator of whether advanced security of BMS 400 is turned on or off and a description of what advanced security is. Via interface 2200, an administrator may view and adjust the advanced security status of BMS 400. For example, as shown in interface 2200 advanced security status dialog box includes the description: "This attribute provides an improved layer of security between site directors and devices. With this attribute set to 'On,' backwards compatible methods of communication between the site director and its servers are disabled, which means a Site Director at a release of new software discards all communication attempts from servers prior to release 10.0."

Figure 23:
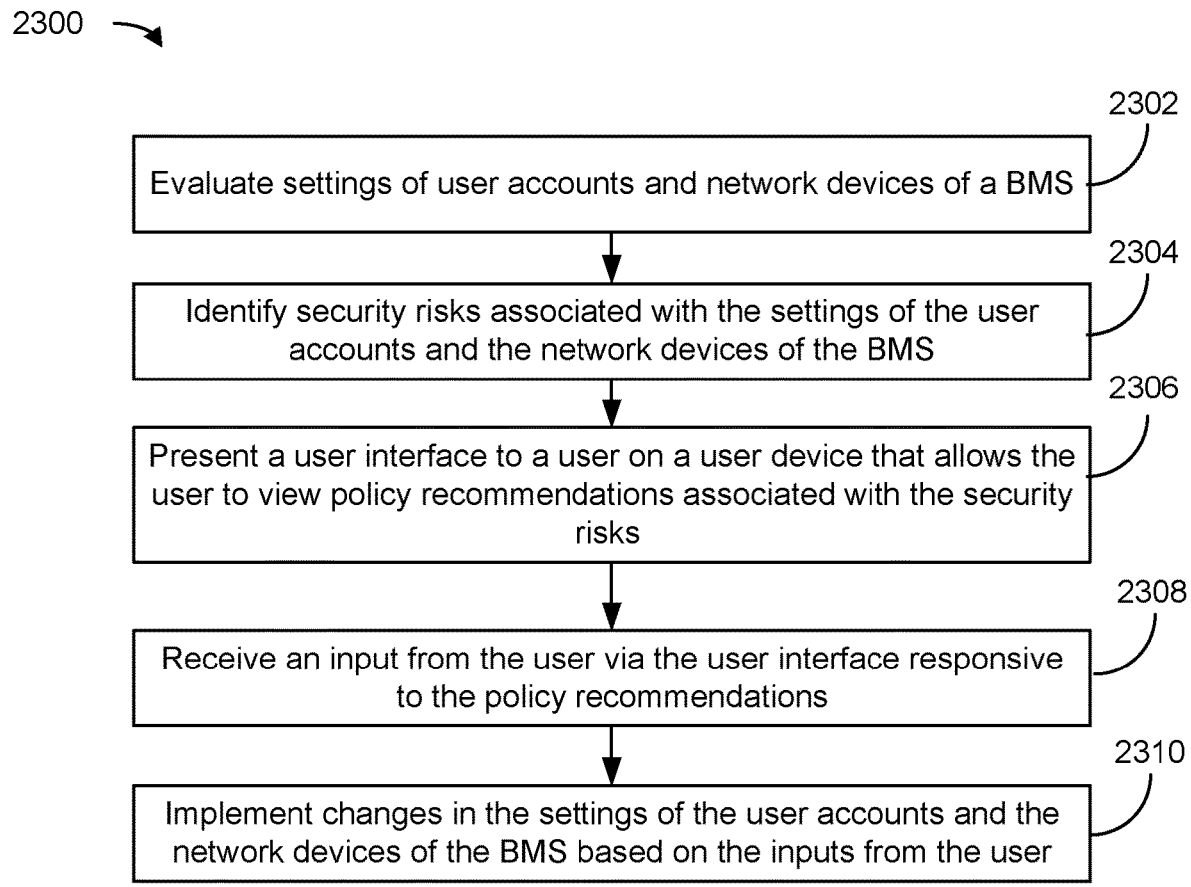
FIG. 23 is a flow diagram of an example process for improving cyber health of the BMS of FIG. 4, according to some embodiments.

Referring now to FIG. 23, an example process 2300 for improving cybersecurity of a BMS (e.g., BMS 400) is shown, according to some embodiments. Process 2300 may allow BMS 400 users (e.g., administrators) to view a large amount of information related to the cyber health of BMS 400 and provide recommendations for how to improve the cyber health of BMS 400. Process 2300 may also allow administrators to implement a change in settings of user accounts or various devices associated with BMS 400 to improve the cyber health of BMS 400. Process 2300 can be conducted by a data processing system (e.g., cyber health management system 504, BMS controller 366, etc.). Process 2300 can include any number of steps and the steps can be performed in any order.

Process 2300 is shown to include evaluating settings of user accounts and network devices of a BMS (step 2302). For example, step 2302 may be performed by evaluator 522 as described above. Step 2302 may include evaluating the user accounts and the network devices by comparing settings of the user accounts and network devices to settings in a database (e.g., security database 530). The database may include a directory including information about various users. The database may also include a look-up table that includes settings of the user accounts and network devices labeled as potential risks, critical issues, or informational. Examples of settings that cyber health management system 504 may compare with the database may include, but are not limited to, maximum time without any interaction before becoming dormant, account lockout policy, time dormant, maximum password age before reset, current software configurations, status of the network device, etc. In some embodiments, cyber health management system 504 uses a system of rules to determine if any network device or user account settings are associated with any security risks.

Process 2300 is shown to include identifying security risks associated with the settings of the user accounts and the network devices (step 2304). For example, step 2304 may be performed by evaluator 522. If cyber health management system 504 identifies a matching setting from the look-up table, cyber health management system 504 may determine whether the matching setting is a potential risk, critical issue, or informational based on the label in the look-up table. Cyber health management system 504 may also identify security risks by applying rules to the settings and determining if any of the settings satisfy a rule that indicates that the setting is a security risk. A critical issue may be a more sever security risk than a potential risk.

For example, cyber health management system 504 may include a rule indicating that if a user account has an inactive session without a session timeout period, then the user account is associated with a security risk. The rules can also be used to determine whether a user account has a password that does not expire, whether a user account has a password history policy, or whether the user account has lockout settings. Further, the rules can be used to determine whether a user account has a lockout policy that has a number of attempts greater than a first threshold or a lockout time greater than a second threshold, whether a user account is dormant, whether a user account has a maximum password age exceeding a threshold, whether a user account has an inactive session period greater than another threshold, or whether a user account is a temporary user account. Cyber health management system 504 may also determine whether a network device is running outdated software. Cyber health management system 504 risks may determine these security risks via the look-up table or the rules.

Process 2300 is shown to include presenting a user interface to a user on a user device that allows the user to view policy recommendations associated with the security risks (step 2306). For example, step 2306 may be performed by user interface generator 526, and the user interface may be the cyber health dashboard interface as described above. The user may view a graph of user activity within BMS 400 over a period of time including information about a number of successful logins, a number of unsuccessful logins, and/or a number of locked out accounts. The user may also view an assessment of the user accounts and network devices including security risks and various other information about them. The security risks may be related to problems that user accounts, network devices (e.g., servers), or any other device of BMS 400 are experiencing. For example, the security risks may indicate settings that pose a strong security risk to malicious attackers attempting to gain access to BMS 400. The security risks may be divided by degrees of severity. For example, settings that pose a security problem may be divided into critical issues and potential risks. Critical issues may be security risks that need to be addressed immediately while potential risks may be risks that a user can monitor or observe and decide whether to act on.

Policy recommendations may be instructions for a user to follow to improve the cyber health of BMS 400 based on security risks related to user accounts and network devices of BMS 400. The user may identify settings to include in a policy recommendation that are specific to a security risk that cyber health management system 504 has identified. The policy recommendation may recommend that the setting change be specific to user accounts or network devices that are associated with the security risk (e.g., set the user accounts without a password expiration date to have a password expiration date of 60 days) or apply to every user account or network device associated with BMS 400 (e.g., set the password expiration date of all user accounts to 60 days). Cyber health management system 504 may identify the policy recommendation by comparing identified security risks associated with the settings of user accounts or network devices to a database (e.g., security database 530) and identifying the matching policy recommendations. Cyber health management system 504 may display the policy recommendation at the user interface.

For example, cyber health management system 504 may determine that a network device is running outdated software based on a rule indicating that the software is associated with a security risk. Cyber health management system 504 may identify the security risk and a policy recommendation that corresponds to the risk that includes advice for how to solve it. The policy recommendation may state "Update the software of the network device to the newest version." Cyber health management system 504 may present the policy recommendation at the user interface.

Process 2300 is shown to include receiving inputs from the user via the user interface responsive to the policy recommendations (step 2308). For example, step 2308 may be performed by user interface generator 526 or setting updater 528, as described above. The user viewing the selected policy recommendation, as described above, may read the policy recommendation and determine to follow the instructions of the recommendation to resolve the security risk associated with the policy recommendation. The user may access the settings of the user accounts or network devices associated with the security risk and change (e.g., adjust) the settings based on the policy recommendation. In some cases, the user may make a global change to the settings of all user accounts and/or network devices to avoid other user accounts and/or network devices from experiencing the same security risk.

For example, a user may select a policy recommendation associated with user accounts that are currently logged in to an inactive session on the application. The user may view the text of the policy recommendation that states that to resolve this problem, the user may reconfigure the settings of all user accounts associated with the application to time out after 30 minutes.

Responsive to viewing the policy recommendation, the user may access a settings page that allows the user to make global changes of the settings for all user accounts of BMS 400. For example, the user may select settings to reconfigure each account to have a session timeout after 30 minutes of inactivity.

Process 2300 is shown to include implement changes in the settings of the user accounts and the network devices of the BMS based at least in part on the inputs from the user or automated responses to the policy recommendations (step 2310). For example, step 2310 may be performed by setting updater 528 as described above. Cyber health management system 504 may identify the user account or user accounts that a user wishes to change the settings for and change the settings based on the user input. As a result of the change, the security risk associated with the change may be resolved and cyber health management system 504 may no longer display it on the cyber health dashboard. Examples of changes include changes in password policy settings of a user account, changes in lockout settings of a user account, updating software of a network device, etc. The user may change the settings by selecting a user account button to navigate to a user account page and manually changing a setting of the user account. Cyber health management system 504 may also be configured to automatically implement the change in security settings once a security risk and an associated policy recommendation have been identified. Cyber health management system 504 may identify a setting update associated with the policy recommendation and implement the setting update by automatically changing settings of a user account or network device.

Advantageously, the systems and methods described herein provide administrators of a BMS (e.g., BMS 400) with a cyber health dashboard that enables the administrators to easily view and improve the cybersecurity health of the BMS. The cyber health dashboard may provide, to an administrator, an assessment of the cyber health of each user account and/or network device associated with the BMS which identifies security risks that may be associated with each user account and/or network device. The assessment may indicate any cybersecurity security risks that could lead to a hacker gaining access to the BMS through the user account or network device. The cyber health dashboard may display cybersecurity improvement recommendations indicating how to improve the cyber health of the BMS and enable administrators to make changes to user accounts or network devices based off of the policy recommendation.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for automatically detecting and mitigating risks related to cybersecurity in a Building Management System (BMS), the method comprising:
   evaluating settings of a user account of the BMS;
   identifying a first security risk associated with the settings of the user account;
   evaluating settings of a network device of the BMS;
   identifying a second security risk associated with the settings of the network device;
   presenting a user interface to a user on a user device, wherein the user interface allows the user to view a policy recommendation associated with the first security risk or the second security risk;

concurrently presenting a plurality of selectable buttons, the plurality of selectable buttons each corresponding to a different user account security risk and a list of a plurality of user accounts experiencing the user account security risk;

in response to a selection of a selectable button of the plurality of selectable buttons and associated with the first security risk, presenting, on the user interface, details regarding the first security risk associated with the settings of the user account, a list of a plurality of user accounts, including the user account, each experiencing the first security risk, and an account settings selectable button that, upon selection, navigates the user to an account settings page comprising information regarding the user account; and implementing a change in the settings of the user account or a change in the settings of the network device within the BMS based at least in part on an input received from the user from the account settings page after the selection of the account settings selectable button.

2. The method of claim 1, wherein identifying the first security risk comprises at least one selected from a group of:
determining that the user account has an inactive session without a session timeout period;
determining that the user account has a password that does not expire;
determining that the user account does not have a password history policy;
determining that the user account does not have lockout settings;
determining that the user account has a lockout policy that has a number of attempts greater than a first threshold or a lockout time greater than a second threshold;
determining that the user account is dormant;
determining that the user account has a maximum password age greater than a third threshold;
determining that the user account has an inactive session period greater than a fourth threshold; and
determining that the user account is a temporary user account.

3. The method of claim 1, wherein the first security risk is more severe than the second security risk, the method further comprising:
presenting, on the user interface, the first security risk as a critical issue; and
presenting, on the user interface, the second security risk as a potential risk.

4. The method of claim 1, wherein identifying the second security risk comprises determining that the network device is running outdated software.

5. The method of claim 1, wherein the network device comprises a server of the BMS.

6. The method of claim 1, further comprising presenting, on the user interface, a graph of user activity within the BMS over a period of time, the graph showing at least one selected from a group of:
a number of successful logins;
a number of unsuccessful logins; and
a number of locked out accounts.

7. The method of claim 1, further comprising presenting, on the user interface, an assessment of all user accounts associated with the BMS and an assessment of all network devices associated with the BMS.

8. The method of claim 1, wherein implementing the change in the settings of the user account comprises at least one selected from a group of implementing a change in password policy settings of the user account and implementing a change in lockout settings of the user account.

9. The method of claim 1, wherein implementing the change in the settings of the network device comprises receiving a software update.

10. The method of claim 1, wherein presenting the details regarding the first security risk and the account settings selectable button comprises presenting a textual description of the first security risk and the list of the plurality of user accounts below the textual description of the first security risk.

11. The method of claim 1, further comprising:
presenting, on a second user interface, a plurality of tabs each corresponding to a different level of security risk,
wherein concurrently presenting the plurality of view details selectable buttons is performed in response to a selection of a tab of the plurality of tabs.

12. A Building Management System (BMS) comprising:
one or more processors; and
one or more computer-readable storage media having instructions stored thereon that, when executed by the one or more processors, cause the one or more processors to implement operations comprising:
evaluating settings of a user account of the BMS;
identifying a first security risk associated with the settings of the user account;
evaluating settings of a network device of the BMS;
identifying a second security risk associated with the settings of the network device;
presenting a user interface to a user on a user device, wherein the user interface allows the user to view a policy recommendation associated with the first security risk or the second security risk;
concurrently presenting a plurality of selectable buttons, the plurality of selectable buttons each corresponding to a different user account security risk and a list of a plurality of user accounts experiencing the user account security risk;
in response to a selection of a selectable button of the plurality of selectable buttons and associated with the first security risk, presenting, on the user interface, details regarding the first security risk associated with the settings of the user account, a list of a plurality of user accounts, including the user account, each experiencing the first security risk, and an account settings selectable button that, upon selection, navigates the user to an account settings page for the user account; and
implementing a change in the settings of the user account or a change in the settings of the network device within the BMS based at least in part on an input received from the user from the account settings page after the selection of the selectable button.

13. The system of claim 12, wherein identifying the first security risk comprises at least one selected from a group of:
determining that the user account has an inactive session without a session timeout period;
determining that the user account has a password that does not expire;
determining that the user account does not have a password history policy; and
determining that the user account does not have lockout settings.

14. The system of claim 12, wherein identifying the first security risk comprises at least one selected from a group of:

determining that the user account has a lockout policy that has a number of attempts greater than a first threshold or a lockout time greater than a second threshold;

determining that the user account is dormant;

determining that the user account has a maximum password age greater than a third threshold;

determining that the user account has an inactive session period greater than a fourth threshold; and determining that the user account is a temporary user account.

15. The system of claim 12, wherein the first security risk is less severe than the second security risk, the operations further comprising:

presenting, on the user interface, the first security risk as a potential risk; and presenting, on the user interface, the second security risk as a critical issue.

16. The system of claim 12, further comprising presenting, on the user interface, a graph of user activity within the BMS over a period of time, the graph showing at least one selected from a group of:

a number of successful logins;

a number of unsuccessful logins; and a number of locked out accounts.

17. The system of claim 12, wherein implementing the change in the settings of the network device comprises receiving a software update.

18. A method, comprising:

evaluating settings of a user account of the BMS;

identifying a first security risk associated with the settings of the user account;

evaluating settings of a network device of the BMS;

identifying a second security risk associated with the settings of the network device;

presenting a user interface to a user on a user device, wherein the user interface allows the user to view a policy recommendation associated with the first security risk or the second security risk;

in response to a selection of a selectable button associated with the first security risk, presenting, on the user interface, details regarding the first security risk associated with the settings of the user account, a list of a plurality of user accounts, including the user account, experiencing the first security risk, and an account settings selectable button that, upon selection, navigates the user to an account settings page comprising information regarding the user account, wherein each respective user account of the list of the plurality of user accounts comprises an identical account setting that causes the respective user account to experience the first security risk, or wherein the user interface is a first user interface, and wherein presenting the details regarding the first security risk, the list of the plurality of user accounts, and the account settings selectable button comprises presenting a second user interface overlaying a first portion of the first user interface while a second portion of the first user interface remains visible, the second user interface comprising the details regarding the first security risk, the list of the plurality of user accounts, and the account settings selectable button; and implementing a change in the settings of the user account based at least in part on an input received from the user from the account settings page after the selection of the account settings selectable button.

* * * * *